US 7,767,829 B2
(12) United States Patent
Cooper et al.

(10) Patent No.: US 7,767,829 B2
(45) Date of Patent: Aug. 3, 2010

(54) WATER-SOLUBLE FLUORO-SUBSTITUTED CYANINE DYES AS REACTIVE FLUORESCENCE LABELLING REAGENTS

(75) Inventors: Michael Edward Cooper, Cardiff (GB); Nicholas John Gardner, Cardiff (GB); Peter Gordon Laughton, Cardiff (GB)

(73) Assignee: GE Healthcare UK Limited, Amersham (GB)

( * ) Notice: Subject to any disclaimer, the term of this patent is extended or adjusted under 35 U.S.C. 154(b) by 1023 days.

(21) Appl. No.: 11/379,596

(22) Filed: Apr. 21, 2006

(65) Prior Publication Data

US 2006/0239922 A1    Oct. 26, 2006

(30) Foreign Application Priority Data

Apr. 22, 2005 (GB) .................................. 0508082.5
Aug. 31, 2005 (GB) .................................. 0517656.5

(51) Int. Cl.
*C09B 23/00* (2006.01)
*G01N 33/00* (2006.01)

(52) U.S. Cl. ...................................... 548/427; 548/455
(58) Field of Classification Search ........................ None
See application file for complete search history.

(56) References Cited

U.S. PATENT DOCUMENTS

| 4,847,385 | A | * | 7/1989 | Kusakata et al. | ............ | 548/455 |
| 4,943,638 | A | * | 7/1990 | Brown et al. | ................ | 548/455 |
| 5,268,486 | A | | 12/1993 | Waggoner et al. | | |
| 5,569,587 | A | | 10/1996 | Waggoner | | |
| 5,583,178 | A | * | 12/1996 | Oxman et al. | ............... | 524/862 |
| 6,048,982 | A | | 4/2000 | Waggoner | | |
| 6,939,975 | B2 | * | 9/2005 | Kawakami et al. | .......... | 548/455 |
| 6,974,873 | B2 | * | 12/2005 | Leung et al. | ................ | 548/455 |

FOREIGN PATENT DOCUMENTS

| JP | 61248789 | | 11/1986 |
| JP | 05313304 | | 11/1993 |
| WO | WO 96/00902 | * | 11/1996 |
| WO | WO 02/24815 | * | 3/2002 |
| WO | WO 02/26891 | | 4/2002 |

OTHER PUBLICATIONS

Troitskaya et al., Chemical Abstracts, 97:57109, 1982.*
Pazenok et al., Chemical Abstracts, 100:53186, 1984.*
Reiffers et al., Chemical Abstracts, 100:85535, 1984.*
Moreau et al., Chemical Abstracts, 82:118759, 1975.*
Renikuntla, B., et al., "Improved Photostability and Fluorescence Properties Through Polyfluorination of a Cyanine Dye", Organic Letters, vol. 6, No. 6, 2004, p. 909-912.
Mader, O., et al., "Structure Property Analysis of Pentamethine Indocyanine Dyes: Identification of a New Dye for Life Science Applications", Bioconjugate Chem., vol. 15, No. 1, 2004, p. 70-78.

* cited by examiner

*Primary Examiner*—Fiona T Powers
(74) *Attorney, Agent, or Firm*—Yonggang Ji

(57) ABSTRACT

Disclosed are cyanine dyes that are useful for labelling and detecting biological and other materials. The dyes are of formula (I):

(I)

in which at least one of groups $R^1$, $R^2$, $R^3$, $R^4$, $R^5$, $R^6$, $R^7$, $R^8$, $R^9$, $R^{10}$ $R^{11}$, $R^{12}$, $R^{13}$ and $R^{14}$ is -L-M or -L-P, where L is a linking group, M is a target bonding group and P is a conjugated component, and at least one of groups $R^3$, $R^4$, $R^5$, $R^6$, $R^7$, $R^8$, $R^9$ and $R^{10}$ comprises fluorine. The use of cyanine dyes substituted by fluorine and having additional substitution with three or more sulphonic acid groups for labelling biological target molecules results in a labelled product in which there is reduced dye-dye aggregation and improved photostability, compared with cyanine dyes having no such substitutions. The dyes of the present invention are particularly useful in assays involving fluorescence detection where continual or repeated excitation is a requirement, for example in kinetic studies, or in microarray analyses where microarray slides may need to be reanalysed over a period of days.

38 Claims, 10 Drawing Sheets

Fluoro-substituted Cyanine Dye Table

| No. | n | $R^1$ | $R^2$ | $R^3 - R^6$ ($R^{16} - R^{19}$) | $R^7 - R^{10}$ | $R^{11}$ | $R^{12}$ | $R^{13}$ | $R^{14}$ |
|---|---|---|---|---|---|---|---|---|---|
| 1 | 2 | -(CH$_2$)$_5$-COOH | -(CH$_2$)$_4$-SO$_3$H | $R^3 - R^6 = F$ | $R^7 - R^{10} = F$ | -(CH$_2$)$_4$-SO$_3$H | -CH$_3$ | -(CH$_2$)$_4$-SO$_3$H | -CH$_3$ |
| 2 | 3 | -(CH$_2$)$_5$-COOH | -(CH$_2$)$_4$-SO$_3$H | $R^3 - R^6 = F$ | $R^7 - R^{10} = F$ | -(CH$_2$)$_4$-SO$_3$H | -CH$_3$ | -(CH$_2$)$_4$-SO$_3$H | -CH$_3$ |
| 3 | 2 | -(CH$_2$)$_4$-SO$_3$H | -(CH$_2$)$_4$-SO$_3$H | $R^4 = -SO_3^-$ | $R^7 - R^{10} = F$ | -(CH$_2$)$_5$-COOH | -CH$_3$ | -(CH$_2$)$_4$-SO$_3$H | -CH$_3$ |
| 4 | 2 | -(CH$_2$)$_5$-COOH | -(CH$_2$)$_5$-COOH | $R^4 = -SO_3^-$ | $R^7 - R^{10} = F$ | -(CH$_2$)$_4$-SO$_3$H | -CH$_3$ | -(CH$_2$)$_4$-SO$_3$H | -CH$_3$ |
| 5 | 2 | -(CH$_2$)$_4$-SO$_3$H | -(CH$_2$)$_5$-COOH | $R^3, R^5 = F$ | $R^7 - R^{10} = F$ | -(CH$_2$)$_4$-SO$_3$H | -CH$_3$ | -(CH$_2$)$_4$-SO$_3$H | -CH$_3$ |
| 6 | 2 | -(CH$_2$)$_4$-SO$_3$H | -(CH$_2$)$_5$-COOH | $R^3 - R^6 = F$ | $R^8, R^{10} = F$ | -(CH$_2$)$_4$-SO$_3$H | -CH$_3$ | -CH$_3$ | -CH$_3$ |
| 7 | 2 | -(CH$_2$)$_4$-SO$_3$H | -(CH$_2$)$_5$-COOH | $R^3, R^5 = F$ | $R^7 - R^{10} = F$ | -(CH$_2$)$_4$-SO$_3$H | -CH$_3$ | -(CH$_2$)$_4$-SO$_3$H | -CH$_3$ |
| 8 | 2 | -(CH$_2$)$_4$-SO$_3$H | -(CH$_2$)$_5$-COOH | $R^4 = -SO_2CF_3$ | $R^7 - R^{10} = F$ | -(CH$_2$)$_4$-SO$_3$H | -CH$_3$ | -(CH$_2$)$_4$-SO$_3$H | -CH$_3$ |
| 9 | 2 | -(CH$_2$)$_4$-SO$_3$H | -(CH$_2$)$_4$-SO$_3$H | $R^3, R^5 = CF_3$ | $R^8, R^{10} = F$ | -(CH$_2$)$_5$-COOH | -CH$_3$ | -(CH$_2$)$_4$-SO$_3$H | -CH$_3$ |
| 10 | 2 | -(CH$_2$)$_4$-SO$_3$H | -(CH$_2$)$_5$-COOH | $R^5 = CF_3$ | $R^7 - R^{10} = F$ | -(CH$_2$)$_4$-SO$_3$H | -CH$_3$ | -(CH$_2$)$_4$-SO$_3$H | -CH$_3$ |
| 11 | 2 | -(CH$_2$)$_4$-SO$_3$H | -(CH$_2$)$_5$-COOH | $R^5, R^6,$ $R^{16} - R^{19} = F$ | $R^7 - R^{10} = F$ | -CH$_3$ | -CH$_3$ | -(CH$_2$)$_4$-SO$_3$H | -CH$_3$ |

Figure 1

Fluoro-substituted Cyanine Dye Table (Continued)

| No. | n | $R^1$ | $R^2$ | $R^3 - R^6$ ($R^{16} - R^{19}$) | $R^7 - R^{10}$ | $R^{11}$ | $R^{12}$ | $R^{13}$ | $R^{14}$ |
|---|---|---|---|---|---|---|---|---|---|
| 12 | 2 | -(CH$_2$)$_4$-SO$_3$H | -(CH$_2$)$_5$-COOH | $R^3 = CF_3$ | $R^8, R^{10} = F$ | -(CH$_2$)$_4$-SO$_3$H | -CH$_3$ | -CH$_3$ | -CH$_3$ |
| 13 | 2 | -(CH$_2$)$_4$-SO$_3$H | -(CH$_2$)$_5$-COOH | $R^3, R^5 = F$ | $R^8, R^{10} = F$ | -(CH$_2$)$_4$-SO$_3$H | -CH$_3$ | -CH$_3$ | -CH$_3$ |
| 14 | 2 | -(CH$_2$)$_4$-SO$_3$H | -(CH$_2$)$_5$-COOH | $R^4 = -SO_3^-$ | $R^8, R^{10} = F$ | -(CH$_2$)$_4$-SO$_3$H | -CH$_3$ | -CH$_3$ | -CH$_3$ |
| 15 | 2 | -(CH$_2$)$_4$-SO$_3$H | -(CH$_2$)$_4$-SO$_3$H | $R^3 - R^6 = F$ | $R^7 - R^{10} = F$ | -(CH$_2$)$_4$-SO$_3$H | -CH$_3$ | -(CH$_2$)$_5$-COOH | -CH$_3$ |
| 16 | 2 | -(CH$_2$)$_4$-SO$_3$H | -(CH$_2$)$_4$-SO$_3$H | $R^3 - R^6 = F$ | $R^8 = F$<br>$R^{10} = CF_3$ | -(CH$_2$)$_4$-SO$_3$H | -CH$_3$ | -(CH$_2$)$_5$-COOH | -CH$_3$ |
| 17 | 2 | -(CH$_2$)$_4$-SO$_3$H | -(CH$_2$)$_4$-SO$_3$H | $R^3 = CF_3$<br>$R^5 = F$ | $R^8 = F$<br>$R^{10} = CF_3$ | -(CH$_2$)$_5$-COOH | -CH$_3$ | -(CH$_2$)$_5$-COOH | -CH$_3$ |
| 18 | 3 | -(CH$_2$)$_4$-SO$_3$H | -(CH$_2$)$_5$-COOH | $R^3, R^5 = CF_3$ | $R^7 - R^{10} = F$ | -(CH$_2$)$_4$-SO$_3$H | -CH$_3$ | -(CH$_2$)$_4$-SO$_3$H | -CH$_3$ |
| 19 | 3 | -(CH$_2$)$_4$-SO$_3$H | -(CH$_2$)$_5$-COOH | $R^4 = CF_3$ | $R^7 - R^{10} = F$ | -(CH$_2$)$_4$-SO$_3$H | -CH$_3$ | -(CH$_2$)$_4$-SO$_3$H | -CH$_3$ |
| 20 | 1 | -(CH$_2$)$_4$-SO$_3$H | -(CH$_2$)$_5$-COOH | $R^3 - R^6 = F$ | $R^7 - R^{10} = F$ | -(CH$_2$)$_4$-SO$_3$H | -CH$_3$ | -(CH$_2$)$_4$-SO$_3$H | -CH$_3$ |
| 21 | 1 | -(CH$_2$)$_5$-COOH | -(CH$_2$)$_5$-COOH | $R^3 - R^6 = F$ | $R^7 - R^{10} = F$ | -(CH$_2$)$_4$-SO$_3$H | -CH$_3$ | -(CH$_2$)$_4$-SO$_3$H | -CH$_3$ |

Figure 2

WATER-SOLUBLE FLUORO-SUBSTITUTED CYANINE DYES AS REACTIVE FLUORESCENCE LABELLING REAGENTS

CROSS-REFERENCE TO RELATED APPLICATIONS

This application claims priority to patent application number 0508082.5 filed in Great Britain on Apr. 22, 2005 and to patent application number 0517656.5 filed in Great Britain on Aug. 31, 2005; the disclosures of which are incorporated herein by reference in their entireties.

FIELD OF THE INVENTION

The present invention relates to the field of fluorescence labelling reagents, in particular, reactive cyanine dyes containing fluoro-substituents and to methods utilising such dyes.

BACKGROUND OF THE INVENTION

Cyanine dyes are widely used as reagents for fluorescence labelling of biologically important molecules such as proteins, nucleic acids, hormones and drugs. Indeed, cyanine dyes offer a number of advantages over other fluorescent dyes. For example, the excitation and emission spectra of cyanine dyes span the visible and near-infrared spectrum from 450 nm to 800 nm. Furthermore, the cyanine dyes are characterised by having very high extinction coefficients and favourable quantum yields. See for example, U.S. Pat. Nos. 6,048,982, 5,268,486, 5,569,587, (Waggoner, A. S. et al). However, with certain cyanine dye structures there is a tendency towards self-association (or aggregation) leading to fluorescence quenching and a notable hypsochromic wavelength shift in absorbance.

Recently, Waggoner et al (Org. Letters, (2004), 6(6), 909-912) has described a polyfluoro-thiadicarbocyanine dye (i) having good photostability in aqueous solvents. The dye exhibited reduced aggregation, enhanced quantum yield and greater resistance to photobleaching when compared with a non-fluorinated analogue.

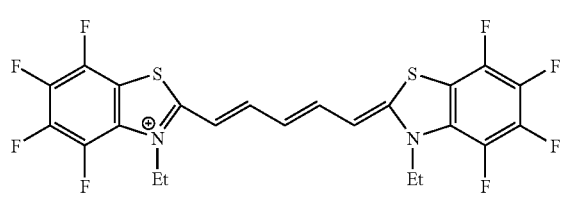
(i)

Modification of the indolinium ring of a carbocyanine dye at least one of the 3-positions, so as to introduce a reactive group or a conjugated substance has been described in WO 02/26891 (Molecular Probes Inc.). The modified dyes according to WO 02/26891 have also been reported to overcome the tendency of cyanine dyes to self-associate and dye conjugates labelled with the modified dyes are reported to be more fluorescent than conjugates labelled with structurally similar carbocyanine dyes.

Japanese Patent Application No. 5313304 (Fuji Photo Film Co. Ltd.) discloses a silver halide photographic sensitive material incorporating a dye containing multiple sulphonate groups and represented by formula (ii):

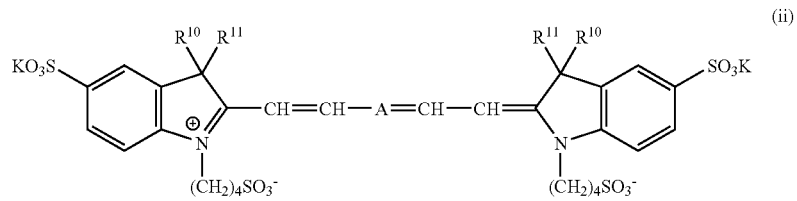
(ii)

in which $R^{10}$ and $R^{11}$ may be alkyl carboxylate or alkyl sulphonate moieties and A includes:

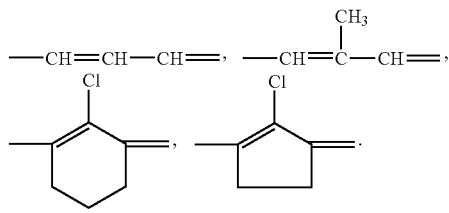

Japanese Patent No. 61248789 (Ricoh KK) discloses an optical information recording medium including a recording layer containing a compound having the formula (iii):

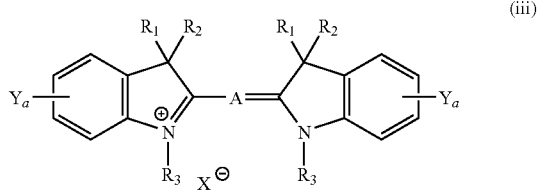
(iii)

in which A is represented by the formula:

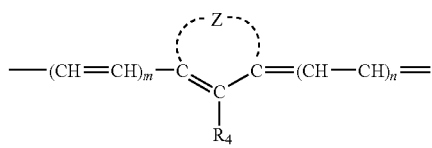

Y is a halogen atom; a is an integer from 1 to 4; $R^1$ and $R^2$ are a $C_1$-$C_5$ alkyl group; $R^3$ is a $C_1$-$C_{10}$ alkyl group which may be substituted by a sulphonyl group or a carboxyl group; $R^4$ is hydrogen, halogen, amino or alkanoyloxy, Z is an atomic group necessary for the formation of a 4-8 membered ring, and m and n are integers from 0-3, where m+n≦3. Mader, O. et al (Bioconjugate Chem., (2004), 15, 70-78) describe the synthesis and photophysical properties of a series of pentamethine indocyanine dyes substituted at the aromatic ring positions with sulphonate, fluorine and methyl.

None of the above documents discloses reactive cyanine dyes and cyanine dyes conjugated to a substance, wherein the dyes contain at least one and preferably multiple fluoro substituents, as well as one or more sulphonic acid groups attached to the indolinium 1- and/or 3-positions of the cyanine chromophore.

BRIEF DESCRIPTION OF THE INVENTION

The present invention provides cyanine dyes and components conjugated with such dyes, in which the cyanine dyes have the properties of increased photostability and reduced dye-dye interactions. The dyes as described and claimed herein may be provided with at least one group suitable for direct covalent labelling of a target material. The dyes of the present invention are therefore particularly useful in assays involving fluorescence detection where continual excitation is a requirement, for example in kinetic studies, or in microarray analyses where microarray slides may need to be reanalysed over a period of days.

BRIEF DESCRIPTION OF THE DRAWINGS

FIG. 1 and FIG. 2 summarise the fluorinated dye compounds that have been synthesized (Compound 1-Compound 21) with reference to Formula (II) and Formula (III);

DETAILED DESCRIPTION OF THE INVENTION

Figure 3:
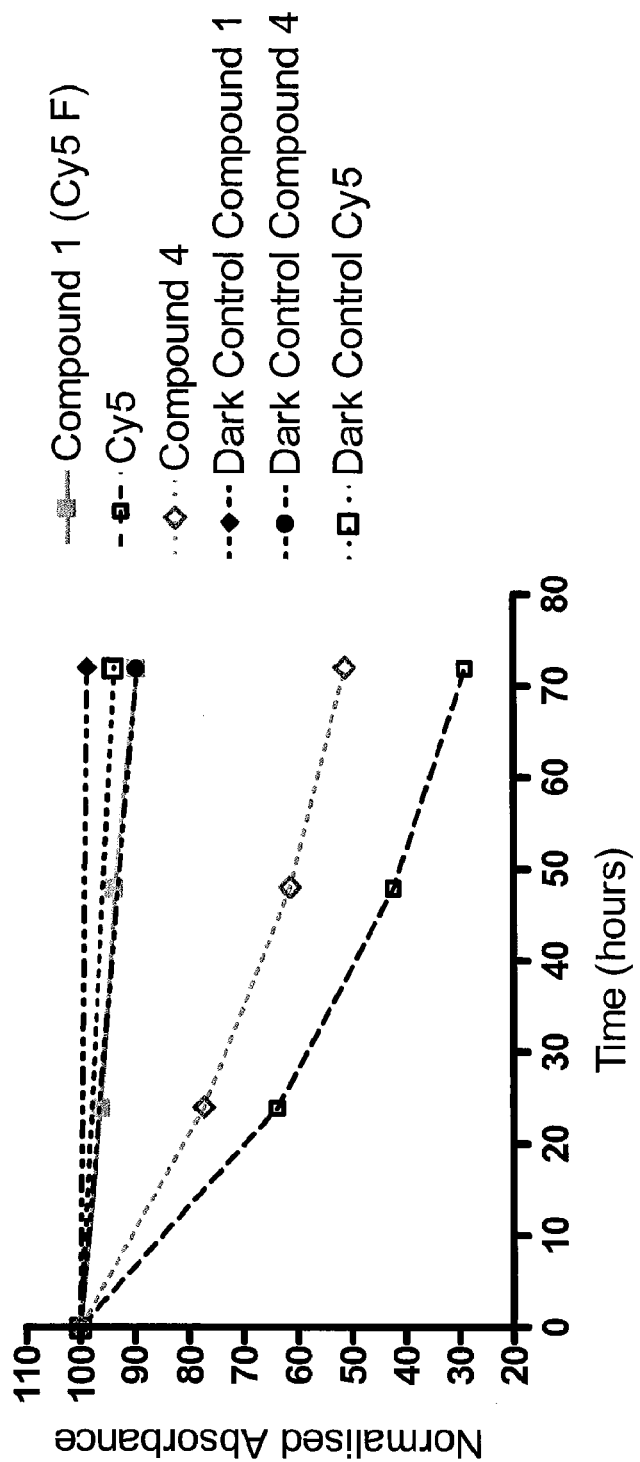
FIG. 3 is a plot illustrating photostability data for Cy5F (Compound 1) and Compound 5. For comparison purposes, photostability data for the non-fluorinated analogue Cy™5 is also presented (Cy™ is a trademark of GE Healthcare Limited)

In a first aspect there is provided a compound of formula (I):

(I)

wherein:

the groups $R^1$, $R^2$, $R^{11}$, $R^{12}$, $R^{13}$ and $R^{14}$ are selected independently from -L-M, -L-P, $C_1$-$C_6$ alkyl and —$(CH_2)_k$—$SO_3H$, where k is an integer from 1 to 10;

the groups $R^3$, $R^4$, $R^5$, $R^6$, $R^7$, $R^8$, $R^9$ and $R^{10}$ are selected independently from hydrogen, -L-M, -L-P, —$SO_3H$, —$SO_2$—$CF_3$ and —$(CF_2)_m$—F, where m is 0 or an integer from 1 to 4; or $R^3$ taken in combination with $R^4$ or $R^5$ taken in combination with $R^6$ and/or $R^7$ taken in combination with $R^8$ or $R^9$ taken in combination with $R^{10}$ form a fused aromatic six-membered ring containing carbon atoms and being optionally substituted one or more times by —$SO_3H$, —$SO_2$—$CF_3$ or —$(CF_2)_m$—F, where m is hereinbefore defined;

L is a linking group having a chain from 1-20 linked atoms selected from the group consisting of carbon, nitrogen, oxygen and sulphur atoms;

M is a target bonding group;

P is a conjugated component;

the groups $R^{15}$ are hydrogen or two or more of $R^{15}$ groups are combined to form a one-ring or two-fused hydrocarbon ring system each ring having five or six carbon atoms, and remaining groups $R^{15}$ are hydrogen; and n is an integer from 1 to 3;

provided that:

i) at least one of groups $R^1$, $R^2$, $R^3$, $R^4$, $R^5$, $R^6$, $R^7$, $R^8$, $R^9$, $R^{10}$ $R^{11}$, $R^{12}$, $R^{13}$ and $R^{14}$ is -L-M or -L-P;

ii) at least one of groups $R^3$, $R^4$, $R^5$, $R^6$, $R^7$, $R^8$, $R^9$ and $R^{10}$ comprises fluorine; and iii) when any one of $R^3$, $R^4$, $R^5$, $R^6$, $R^7$, $R^8$, $R^9$ and $R^{10}$ is —$SO_3H$ at least one of groups $R^{11}$, $R^{12}$, $R^{13}$ and $R^{14}$ is selected from -L-M, -L-P and —$(CH_2)_k$—$SO_3H$.

The compounds according to the formula (I) will suitably include a counter-ion, which may be positive or negative to balance the formal charge (or charges) on the dye chromophore. The nature of the counter-ion is not material to the invention and could be one of many known ions such as $NH_4^+$, $K^+$, $Na^+$, trifluoroacetate ($F_3C$—$CO_2^-$), perchlorate ($ClO_4^-$), $Br^-$, or $I^-$. In the context of the present invention, it is to be understood that the sulphonic acid group (—$SO_3H$) will also include the sulphonate group (—$SO_3^-$), since sulphonate is the ionised form of the parent acid.

In one embodiment according to the first aspect, compounds of formula (I) are provided wherein:

the groups $R^1$ and $R^2$ are selected independently from -L-M, -L-P, $C_1$-$C_6$ alkyl and —$(CH_2)_k$—$SO_3H$;

the groups $R^3$, $R^4$, $R^5$, $R^6$, $R^7$, $R^8$, $R^9$ and $R^{10}$ are selected independently from hydrogen, —$SO_3H$, —$SO_2$—$CF_3$ and —$(CF_2)_m$—F, where m is 0 or an integer from 1 to 4; or $R^3$ taken in combination with $R^4$ or $R^5$ taken in combination with $R^6$ and/or $R^7$ taken in combination with $R^8$ or $R^9$ taken in combination with $R^{10}$ form a fused aromatic six-membered ring containing carbon atoms and being optionally substituted one or more times by —$SO_3H$, —$SO_2$—$CF_3$ or —$(CF_2)_m$—F, where m is hereinbefore defined;

the groups $R^{11}$, $R^{12}$, $R^{13}$ and $R^{14}$ are selected independently from $C_1$-$C_6$ alkyl and —$(CH_2)_k$—$SO_3H$; and groups $R^{15}$, L, M and P, k and n are hereinbefore defined;

provided that:
i) at least one of groups $R^1$ and $R^2$ is -L-M or -L-P;
ii) at least one of groups $R^3$, $R^4$, $R^5$, $R^6$, $R^7$, $R^8$, $R^9$ and $R^{10}$ comprises fluorine; and
iii) when any one of $R^3$, $R^4$, $R^5$, $R^6$, $R^7$, $R^8$, $R^9$ and $R^{10}$ is —SO$_3$H at least one of groups $R^{11}$, $R^{12}$, $R^{13}$ and $R^{14}$ is —(CH$_2$)$_k$—SO$_3$H.

In an alternative embodiment according to the first aspect, compounds of formula (I) are provided wherein:

the groups $R^{11}$, $R^{12}$, $R^{13}$ and $R^{14}$ are selected independently from -L-M, -L-P, C$_1$-C$_6$ alkyl and —(CH$_2$)$_k$—SO$_3$H, the groups $R^3$, $R^4$, $R^5$, $R^6$, $R^7$, $R^8$, $R^9$ and $R^{10}$ are selected independently from hydrogen, —SO$_3$H, —SO$_2$—CF$_3$ and —(CF$_2$)$_m$—F, where m is 0 or an integer from 1 to 4; or $R^3$ taken in combination with $R^4$ or $R^5$ taken in combination with $R^6$ and/or $R^7$ taken in combination with $R^8$ or $R^9$ taken in combination with $R^{10}$ form a fused aromatic six-membered ring containing carbon atoms and being optionally substituted one or more times by —SO$_3$H, —SO$_2$—CF$_3$ or —(CF$_2$)$_m$—F, where m is hereinbefore defined;

the groups $R^1$ and $R^2$ are selected independently from C$_1$-C$_6$ alkyl and —(CH$_2$)$_k$—SO$_3$H; and groups $R^{15}$, L, M and P, k and n are hereinbefore defined;

provided that:
i) at least one of groups $R^{11}$, $R^{12}$, $R^{13}$ and $R^{14}$ is -L-M or -L-P;
ii) at least one of groups $R^3$, $R^4$, $R^5$, $R^6$, $R^7$, $R^8$, $R^9$ and $R^{10}$ comprises fluorine; and
iii) when any one of $R^3$, $R^4$, $R^5$, $R^6$, $R^7$, $R^8$, $R^9$ and $R^{10}$ is —SO$_3$H at least one of groups $R^{11}$, $R^{12}$, $R^{13}$ and $R^{14}$ is —(CH$_2$)$_k$—SO$_3$H.

Preferably, at least one of groups $R^3$, $R^4$, $R^5$, $R^6$, $R^7$, $R^8$, $R^9$ and $R^{10}$ is fluorine.

In one preferred embodiment, groups $R^{15}$ are all hydrogen. In an alternative embodiment, the polymethine bridge linking the heterocyclic portions of the compounds according to formula (I) may comprise a hydrocarbon ring system of general formula:

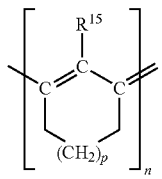

wherein n is an integer from 1 to 3 and p is 0 or 1. Any remaining groups $R^{15}$ are hydrogen. Examples of hydrocarbon ring systems forming the polymethine bridge are shown in Table 1.

TABLE 1

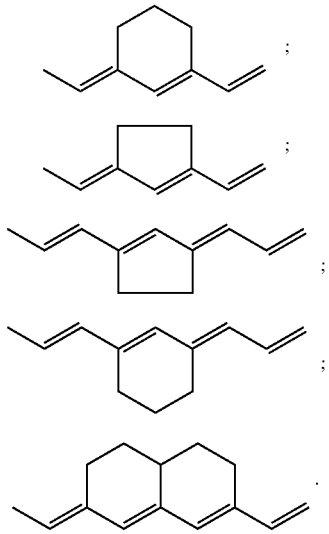

TABLE 1-continued

The linking group L links the target bonding group M or conjugated component P with the cyanine chromophore in the compounds according to formula (I) and is suitably covalently attached to the $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ positions of the dye. Preferably, the dyes of the present invention contain a single target bonding group -L-M, covalently attached to one of the $R^1$, $R^2$, $R^{11}$, $R^{12}$, $R^{13}$ or $R^{14}$ positions. The skilled person will understand that dyes according to the present invention and having a target bonding group may also include the group -L-P, wherein the fluorescent dye is conjugated to a target component. L is suitably a straight or branched chain of from 1 to 20 linked atoms containing carbon, nitrogen, oxygen and sulphur atoms. Preferably, L is a linking group having the formula:

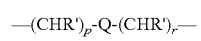

where Q is selected from: —CHR'—, —NR'—, —O—, —S—, —CR'=CR'—, —Ar—, —C(O)—NR'— and —C(O)—O—, where R' is hydrogen or C$_1$-C$_4$ alkyl; Ar is phenylene, optionally substituted with sulphonate; p is 0-5 and r is 1-5. Q is preferably selected from: —CHR'— and —C(O)—NH—, where R' is hydrogen or C$_1$-C$_4$ alkyl; more preferably Q is —CHR'— and R' is hydrogen. In particularly preferred embodiments according to the invention, -L-M and/or -L-P comprise a carboxypentyl group.

Suitably, the fluorescent cyanine dyes of the present invention comprise at least one, preferably two or more fluorine atoms substituted directly or indirectly onto the cyanine dye chromophore. In one embodiment, compounds of formula (I) are suitably substituted by a fluorine atom at least one, preferably at least two, and more preferably at least three of the $R^3$, $R^4$, $R^5$ and $R^6$ positions and/or the $R^7$, $R^8$, $R^9$ and $R^{10}$ positions. In this embodiment, substitution by one or more fluorine atoms may give rise to symmetric or asymmetric dyes. In particularly preferred embodiments, each of the $R^3$, $R^4$, $R^5$ and $R^6$ positions and/or the $R^7$, $R^8$, $R^9$ and $R^{10}$ positions are substituted by fluorine. Perfluoro substitution of the cyanine dye chromophore has been found to lower dye-dye aggregation, thereby reducing fluorescence quenching and enhancing dye photostability (Waggoner, A. et al, loc cit). Alternatively, the compounds of formula (I) may include a

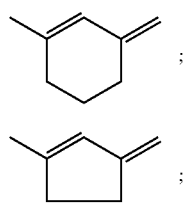

perfluoro $C_1$-$C_4$ alkyl substituted at one, preferably not more than two of the $R^3$, $R^4$, $R^5$ or $R^6$ positions and/or the $R^7$, $R^8$, $R^9$ or $R^{10}$ positions. Any remaining groups $R^3$, $R^4$, $R^5$, $R^6$, $R^7$, $R^8$, $R^9$ and $R^{10}$ are selected from H or F, provided that at least one of the remaining groups $R^3$, $R^4$, $R^5$, $R^6$, $R^7$, $R^8$, $R^9$ and $R^{10}$ is F. Preferably, the perfluoro $C_1$-$C_4$ alkyl substituent is trifluoromethyl. In a still further embodiment, the compounds of formula (I) may include the group —$SO_2$—$CF_3$ substituted at least one, usually not more than two of the $R^3$, $R^4$, $R^5$ or $R^6$ positions and/or the $R^7$, $R^8$, $R^9$ or $R^{10}$ positions. Remaining groups $R^3$, $R^4$, $R^5$, $R^6$, $R^7$, $R^8$, $R^9$ and $R^{10}$ are selected from H or F, preferably F.

Particular examples of cyanine dyes according to the present invention having indole or benzindole ring systems are shown as compounds of formula (II), (III) and (IV) in Table 2.

TABLE 2

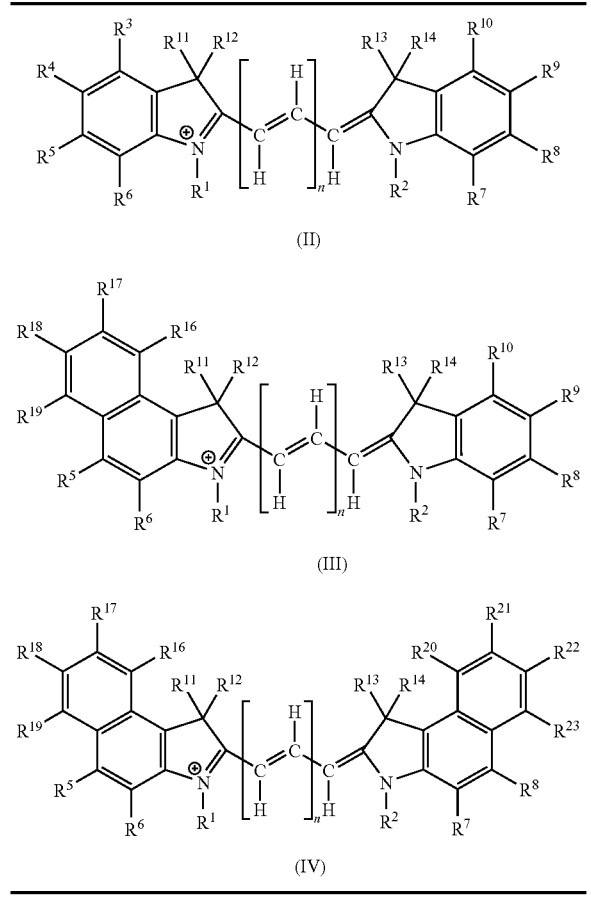

(II)

(III)

(IV)

In the compounds of formula (II), (III) and (IV), at least one of groups $R^1$, $R^2$, $R^{11}$, $R^{12}$, $R^{13}$ and $R^{14}$ is -L-M or -L-P, where L is a linking group having the formula:

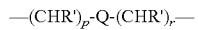

—$(CHR')_p$-Q-$(CHR')_r$— where Q is selected from: —CHR'—, —NR'—, —O—, —S—, —C(O)—NR'— and —C(O)—O—, where R' is hydrogen or $C_1$-$C_4$ alkyl; p is 0-5 and r is 1-5;

M is a target bonding group; and

P is a conjugated component;

when any of groups $R^1$, $R^2$, $R^{11}$, $R^{12}$, $R^{13}$ and $R^{14}$ is not -L-M or -L-P, said remaining groups $R^1$, $R^2$, $R^{11}$, $R^{12}$, $R^{13}$ and $R^{14}$ are selected independently from $C_1$-$C_6$ alkyl, and —$(CH_2)_k$—$SO_3H$, where k is an integer from 1 to 10;

at least one of groups $R^3$, $R^4$, $R^5$, $R^6$, $R^7$, $R^8$, $R^9$ and $R^{10}$ comprises at least one fluoro group selected from —$SO_2$—$CF_3$ and —$(CF_2)_m$—F, where m is 0 or an integer from 1 to 4;

when any of groups $R^3$, $R^4$, $R^5$, $R^6$, $R^7$, $R^8$, $R^9$ and $R^{10}$ is not —$SO_2$—$CF_3$ or —$(CF_2)_m$—F, remaining groups $R^3$, $R^4$, $R^5$, $R^6$, $R^7$, $R^8$, $R^9$ and $R^{10}$ are hydrogen;

groups $R^{16}$, $R^{17}$, $R^{18}$, $R^{19}$, $R^{20}$, $R^{21}$, $R^{22}$ and $R^{23}$ when present are selected independently from hydrogen, —$SO_2$—$CF_3$ and —$(CF_2)_m$—F, where m is hereinbefore defined; and n is an integer from 1 to 3.

In one embodiment, at least one of groups $R^1$ and $R^2$ of the compounds of formula (II), (III) and (IV) is -L-M or -L-P and any remaining group $R^1$ or $R^2$ is selected from $C_1$-$C_6$ alkyl and —$(CH_2)_k$—$SO_3H$;

at least one of groups $R^{11}$, $R^{12}$, $R^{13}$ and $R^{14}$ is —$(CH_2)_k$—$SO_3H$ and any remaining groups $R^{11}$, $R^{12}$, $R^{13}$ and $R^{14}$ are $C_1$-$C_6$ alkyl; and groups $R^3$, $R^4$, $R^5$, $R^6$, $R^7$, $R^8$, $R^9$, $R^{10}$, $R^{16}$, $R^{17}$, $R^{18}$, $R^{19}$, $R^{20}$, $R^{21}$, $R^{22}$, $R^{23}$, L, M, P, k and n are hereinbefore defined. Preferably, remaining group $R^1$ or $R^2$ is —$(CH_2)_k$—$SO_3H$.

Preferably, at least one of groups $R^3$, $R^4$, $R^5$, $R^6$, $R^7$, $R^8$, $R^9$ and $R^{10}$ is fluorine.

In this embodiment, suitably, at least two of groups $R^{11}$, $R^{12}$, $R^{13}$ and $R^{14}$ are the group —$(CH_2)_k$—$SO_3H$. Preferably, one of groups $R^{11}$ and $R^{12}$, and one of groups $R^{13}$ and $R^{14}$ is the group —$(CH_2)_k$—$SO_3H$, and remaining groups $R^{11}$, $R^{12}$, $R^{13}$ or $R^{14}$ are $C_1$-$C_6$ alkyl, where k is hereinbefore defined. In these embodiments, remaining groups $R^{11}$ or $R^{12}$ and $R^{13}$ or $R^{14}$ are preferably methyl. Preferably k is 3 or 4. Thus, particularly preferred —$(CH_2)_k$—$SO_3H$ groups are selected from —$(CH_2)_3$—$SO_3H$ and —$(CH_2)_4$—$SO_3H$.

In an alternative embodiment, at least one of groups $R^{11}$, $R^{12}$, $R^{13}$ and $R^{14}$ of the compounds of formula (II), (III) and (IV) is -L-M or -L-P and any remaining groups $R^{11}$, $R^{12}$, $R^{13}$ and $R^{14}$ are selected from $C_1$-$C_6$ alkyl, and —$(CH_2)_k$—$SO_3H$;

at least one of groups $R^1$ and $R^2$ is —$(CH_2)_k$—$SO_3H$ and any remaining group $R^1$ or $R^2$ is $C_1$-$C_6$ alkyl; and groups $R^3$, $R^4$, $R^5$, $R^6$, $R^7$, $R^8$, $R^9$, $R^{10}$, $R^{16}$, $R^{17}$, $R^{18}$, $R^{19}$, $R^{20}$, $R^{21}$, $R^{22}$, $R^{23}$, L, M, P, k and n are hereinbefore defined.

Preferably, at least one of groups $R^3$, $R^4$, $R^5$, $R^6$, $R^7$, $R^8$, $R^9$ and $R^{10}$ is fluorine.

Preferably, in this embodiment, both groups $R^1$ and $R^2$ are —$(CH_2)_k$—$SO_3H$, where k is an integer from 1 to 10. Particularly preferred groups —$(CH_2)_k$—$SO_3H$ are those in which k is 3 or 4, that is —$(CH_2)_3$—$SO_3H$ and —$(CH_2)_4$—$SO_3H$.

Preferably, Q is selected from —CHR'— and —C(O)—NH—, where R' is hydrogen or $C_1$-$C_4$ alkyl. More preferably Q is —CHR'— and R' is hydrogen. In particularly preferred embodiments, -L-M and/or -L-P comprise a carboxypentyl group.

In structures (II) to (IV), at least one of groups $R^3$, $R^4$, $R^5$, $R^6$, $R^7$, $R^8$, $R^9$ and $R^{10}$ comprises at least one fluoro group selected from —$SO_2$—$CF_3$ and —$(CF_2)_m$—F, where m is 0 or an integer from 1 to 4. Any remaining groups $R^3$, $R^4$, $R^5$, $R^6$, $R^7$, $R^8$, $R^9$ and $R^{10}$ are hydrogen. Suitably, at least one, preferably at least two, and more preferably at least three of the $R^3$, $R^4$, $R^5$ and $R^6$ positions and/or the $R^7$, $R^8$, $R^9$ and $R^{10}$ positions are substituted by fluorine. In particularly preferred embodiments, each of the $R^3$, $R^4$, $R^5$ and $R^6$ positions and/or the $R^7$, $R^8$, $R^9$ and $R^{10}$ positions are substituted by fluorine and any remaining groups $R^3$, $R^4$, $R^5$, $R^6$, $R^7$, $R^8$, $R^9$ and $R^{10}$ are hydrogen. In alternative embodiments, at least one and usually not more that two of groups $R^3$, $R^4$, $R^5$ and $R^6$ and/or groups $R^7$, $R^8$, $R^9$ and $R^{10}$ is a perfluoro $C_1$-$C_4$ alkyl group or a —$SO_2$—$CF_3$ group. Any remaining groups $R^3$, $R^4$, $R^5$, $R^6$, $R^7$, $R^8$, $R^9$ and $R^{10}$ are selected from H or F, preferably F. A preferred perfluoro $C_1$-$C_4$ alkyl group is trifluoromethyl.

Groups $R^{16}$, $R^{17}$, $R^{18}$, $R^{19}$, $R^{20}$, $R^{21}$, $R^{22}$ and $R^{23}$ when present are selected independently from hydrogen, —$SO_2$—$CF_3$ and —$(CF_2)_m$—F, wherein m is hereinbefore defined. Usually not more than two, preferably not more than one —$SO_2$—$CF_3$ or perfluoro $C_1$-$C_4$ alkyl group is substituted at the $R^{16}$, $R^{17}$, $R^{18}$, $R^{19}$ and/or $R^{20}$, $R^{21}$, $R^{22}$ and $R^{23}$ positions. Preferably, groups $R^{16}$, $R^{17}$, $R^{18}$, $R^{19}$, $R^{20}$, $R^{21}$, $R^{22}$ and $R^{23}$ are selected independently from hydrogen and fluorine.

Optionally, dyes according to the present invention having 1, 2, 3, or 4 fluoro groups attached thereto, may be further substituted with one or more sulphonic acid groups attached directly to the remaining $R^3$, $R^4$, $R^5$, $R^6$, $R^7$, $R^8$, $R^9$ or $R^{10}$ positions. Thus, dyes according to the present invention may be substituted directly or indirectly with up to four or more sulphonic acid groups, preferably between three and five sulphonic acid groups. The use of cyanine dyes substituted by fluorine and having additional substitution with three or more sulphonic acid groups for labelling biological target molecules results in a labelled product in which there is reduced dye-dye aggregation and improved photostability, compared with cyanines having no such substitutions. The fluorescence emission intensity of a molecule so labelled with the preferred dyes of the present invention increases with the number of covalently attached dyes. Furthermore, substitution of the indolinium 1- and/or 3-positions with sulphonic acid groups in addition to increasing the overall charge on the dye molecule, also adds steric bulk, thereby contributing to a reduction in dye-dye aggregation.

Suitably, the target bonding group M is a group that reacts with a complementary group of a component to be labelled, with the formation of a covalent linkage between the dye and the conjugated component. The choice of target bonding group will depend on the groups that are available on the component to be labelled and, as such, will be well known to the skilled person. For example, the target bonding group may be a reactive group that can react under suitable conditions with a complementary functional group of a component. Examples of functional groups present in components, such as proteins, peptides, nucleic acids carbohydrates and the like, include hydroxy, amino, sulphydryl, carbonyl (including aldehyde and ketone), carboxylic acid and thiophosphate. Alternatively, the target bonding group M may be a functional group and the target may contain, or be derivatised to contain a reactive constituent, such that the functional group of the dye may be reacted under suitable conditions with the reactive group of the target component. In either case, the component becomes labelled with the dye according to formula (I). Suitably, when M is a reactive group, it is selected from succinimidyl ester, sulpho-succinimidyl ester, 4-sulfo-2,3,5,6-tetrafluorophenol (STP) ester, isothiocyanate, maleimide, haloacetamide, acid halide, hydrazide, vinylsulphone, dichlorotriazine and phosphoramidite. Preferably, the reactive group is a succinimidyl ester of a carboxylic acid, an isothiocyanate, a maleimide, a haloacetamide or a phosphoramidite. When M is a functional group, it is suitably selected from hydroxy, amino, sulphydryl, carbonyl (including aldehyde and ketone), carboxylic acid and thiophosphate, preferably hydroxy, amino or sulphydryl. By virtue of these reactive and functional groups the compounds of formula (I) may be reacted with and become covalently bound to the target component.

Examples of reactive groups at the $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ positions of the compound according to formula (I) and the groups with which groups $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ can react are provided in Table 3. In the alternative, $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ may be the functional groups of Table 3 which would react with the reactive groups of a target component.

TABLE 3

Reactive Groups and Functional Groups Reactive Therewith

| Reactive Groups | Functional Groups |
|---|---|
| succinimidyl ester, sulpho-succinimidyl ester | primary amino, secondary amino |
| 4-sulfo-2,3,5,6-tetrafluorophenol (STP) ester | primary amino, secondary amino |
| anhydrides, acid halides | primary amino, secondary amino, hydroxyl |
| isothiocyanate | amino groups |
| vinylsulphone | amino groups |
| dichlorotriazines | amino groups |
| haloacetamides, maleimides | thiols, imidazoles, hydroxyl, amines, thiophosphates |
| carbodiimide | carboxylic acids |
| hydrazine, hydrazide | carbonyl including aldehyde and ketone |
| phosphoramidites | hydroxyl groups |

Particularly preferred reactive groups which are especially useful for labelling target components with available amino and hydroxyl functional groups include:

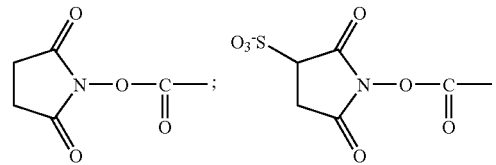

Particularly preferred reactive groups which are useful for labelling target components with available thiol functional groups include:

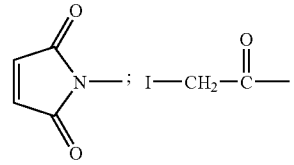

Particularly preferred examples of the group -L-M are those which comprise a carboxypentyl group, for example:

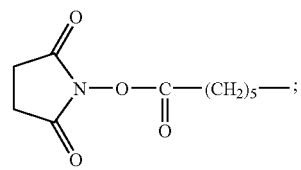

-continued

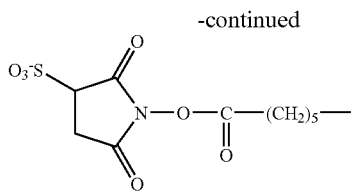

In another embodiment, the target bonding group M may be an affinity tag which is capable of binding specifically and non-covalently with its complementary specific binding partner, thereby forming a specific binding pair. Examples of specific binding pairs include, but are not restricted to: biotin/avidin, biotin/streptavidin, polyhistidine tag-metal ion complexes with nitrilotriacetic acid (e.g. $Ni^{2+}$: NTA). The complementary specific binding partner may be one component of a labelling complex for detection of a target component. Thus, in one preferred labelling format, streptavidin, having four sites of attachment for a biotin label, may be used as a bridge linking a biotin group on the target component with a dye according to the present invention wherein group M is biotin, iminobiotin or desthiobiotin. It is to be understood that in the context of the present invention, any two atoms or molecules that possess a specific binding affinity one for the other, may be employed. Preferred examples of affinity tags are selected from biotin, iminobiotin and desthiobiotin.

The following are more specific examples of cyanine dyes according to the invention, as shown in Table 4.

TABLE 4

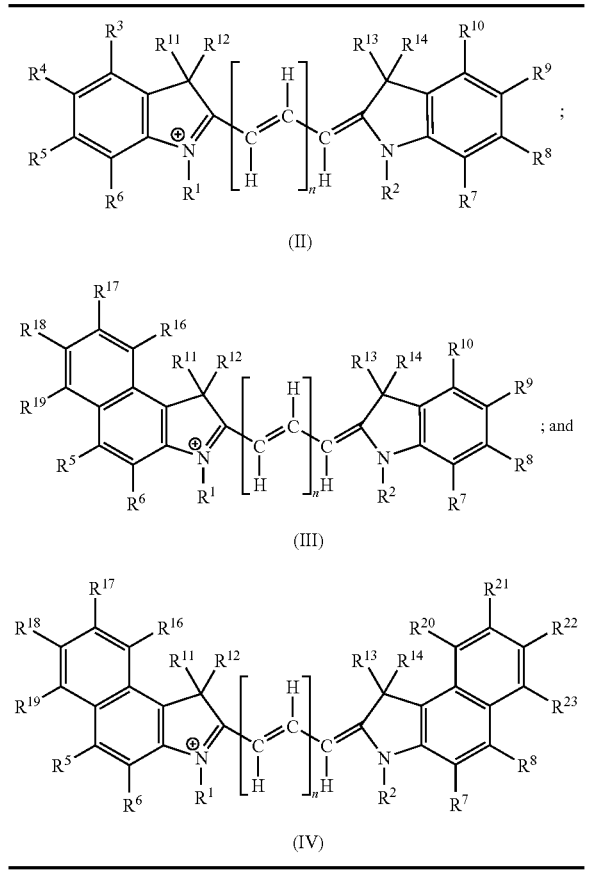

wherein:

groups $R^1$, $R^2$ and $R^{11}$ are selected from —$(CH_2)_5$—COOH and —$(CH_2)_4$—$SO_3H$;

group $R^{13}$ is selected from —$(CH_2)_5$—COOH, —$(CH_2)_4$—$SO_3H$ and —$CH_3$;

groups $R^{12}$ and $R^{14}$ are —$CH_3$;

at least two of groups $R^3$, $R^4$, $R^5$ and $R^6$ and/or groups $R^7$, $R^8$, $R^9$ and $R^{10}$ are F;

remaining groups $R^3$, $R^4$, $R^5$, $R^6$, $R^7$, $R^8$, $R^9$ or $R^{10}$ are selected from H, —$SO_3^-$, —$SO_2$—$CF_3$ and —$CF_3$;

groups $R^{16}$, $R^{17}$, $R^{18}$ and $R^{19}$ and/or groups $R^{20}$, $R^{21}$, $R^{22}$ and $R^{22}$ when present are F; and n is an integer from 1 to 3.

In compounds of the present invention, group -L-M is suitably a succinimidyl ester derivative of an alkyl carboxylic acid, preferably 5-carboxypentyl, N-hydroxysuccinimidyl ester, or 5-carboxypentyl, N-hydroxysulphosuccinimidyl ester.

Particular examples of dyes according to the first aspect of the invention are as follows:

i) 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium (Cy5F) (Compound 1);

ii) 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3-5-trienyl}-4,5,6,7-tetrafluoro-3-methyl-1,3-bis(4-sulfobutyl)-3H-indolium (Cy7F) (Compound 2);

iii) 3-(5-Carboxypentyl)-3-methyl-5-sulfo-1-(4-sulfobutyl)-2-{1E,3E,5E}-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 3);

iv) 1-(5-Carboxypentyl)-3-methyl-5-sulfo-3-(4-sulfobutyl)-2-{(1E,3E,5E)-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 4);

v) 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,6-difluoro-3-methyl-1,3-bis(4-sulfobutyl)-3H-indolium (Compound 5);

vi) 2-{(1E,3E,5E)-5-[1-(5-Carboxypentyl)-4,6-difluoro-3,3-dimethyl-1,3-dihydro-2H-indol-2-ylidene]penta-1,3-dienyl}-4,5,6,7-tetrafluoro-3-methyl-1,3-bis(4-sulfobutyl)-3H-indolium (Compound 6);

vii) 1-(5-Carboxypentyl)-2-{(1E,3E,5E)-5-[1-(5-carboxypentyl)-4,6-difluoro-3,3-dimethyl-1,3-dihydro-2H-indol-2-ylidene]penta-1,3-dienyl}-4,5,6,7-tetrafluoro-3-methyl-3-(4-sulfobutyl)-3H-indolium (Compound 7);

viii) 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sulfobutyl)-5-[(trifluoromethyl)sulfonyl]-3H-indolium (Compound 8);

ix) 2-{(1E,3E,5E)-5-[1-(4-Sulfobutyl)-4,6-bis(trifluoromethyl)-3-methyl-3-(5-carboxypentyl))-1,3-dihydro-2H-indol-2-ylidene]penta-1,3-dienyl}-4,6-difluoro-3-methyl-1,3-bis(4-sulfobutyl)-3H-indolium (Compound 9);

x) 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sul-fobutyl)-6-(trifluoromethyl)-3H-indolium (Compound 10);

xi) 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7,8,9-hexafluoro-1,1-dimethyl-3-(4-sulfobutyl)-1H-benzo[e]indolium (Compound 11);

xii) 2-{(1E,3E,5E)-5-[1-(5-Carboxypentyl)-4,6-difluoro-3,3-dimethyl-1,3-dihydro-2H-indol-2-ylidene]penta-1,3-dienyl}-6-fluoro-3-methyl-1,3-bis(4-sulfobutyl)-4-(trifluoromethyl)-3H-indolium (Compound 12);

xiii) 2-{(1E,3E,5E)-5-[1-(5-Carboxypentyl)-4,6-difluoro-3,3-dimethyl-1,3-dihydro-2H-indol-2-ylidene]penta-1,3-dienyl}-4,6-difluoro-3-methyl-1,3-bis(4-sulfobutyl)-3H-indolium (Compound 13);

xiv) 2-{(1E,3E,5E)-5-[1-(5-Carboxypentyl)-4,6-difluoro-3,3-dimethyl-1,3-dihydro-2H-indol-2-ylidene]penta-1,3-dienyl}-3-methyl-5-sulfo-1,3-bis(4-sulfobutyl)-3H-indolium (Compound 14);

xv) 2-{(1E,3E,5E)-5-[3-(5-Carboxypentyl)-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis-(4-sulfobutyl)-3H-indolium (Compound 15);

xvi) 2-{(1E,3E,5E)-5-[3-(5-Carboxypentyl)-6-fluoro-3-methyl-1-(4-sulfobutyl)-4-(trifluoromethyl)-1,3-dihydro-2H-indol-2-ylidene]penta-1,3-dienyl}-4,5,6,7-tetrafluoro-3-methyl-1,3-bis(4-sulfobutyl)-3H-indolium (Compound 16);

xvii) 2-{(1E,3E,5E)-5-[3-(5-Carboxypentyl)-4-trifluoromethyl-6-fluoro-3-methyl-1,3-dihydro-2H-indol-2-ylidene]penta-1,3-dienyl}-3-(5-carboxypentyl)-4-trifluoromethyl-6-fluoro-3-methyl-3H-indolium (Compound 17);

xviii) 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3,5-trienyl}-3-methyl-1,3-bis(4-sulfobutyl)-4,6-bis(trifluoromethyl)-3H-indolium (Compound 18);

xix) 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3,5-trienyl}-3-methyl-1,3-bis(4-sulfobutyl)-5-trifluoromethyl-3H-indolium (Compound 19);

xx) 2-{(1E,3E)-3-[1-(5-Carboxypentyl)-4,5,6,7-tetrafluoro-3-methyl-3-(4-sulfobutyl)-1,3-dihydro-2H-indol-2-ylidene]prop-1-enyl}-4,5,6,7-tetrafluoro-3-methyl-1,3-bis(4-sulfobutyl)-3H-indolium (Compound 20); and xxi) 1-(5-Carboxypentyl)-2-{(1E,3E)-3-[1-(5-carboxypentyl)-4,5,6,7-tetrafluoro-3-methyl-3-(4-sulfobutyl)-1,3-dihydro-2H-indol-2-ylidene]prop-1-enyl}-4,5,6,7-tetrafluoro-3-methyl-3-(4-sulfobutyl)-3H-indolium (Compound 21).

The present invention also relates to labelling methods wherein the compounds according to the first aspect including at least one group -L-M attached to the R$^1$, R$^2$, R$^3$, R$^4$, R$^5$, R$^6$, R$^7$, R$^8$, R$^9$, R$^{10}$ R$^{11}$, R$^{12}$, R$^{13}$ and/or R$^{14}$ positions as hereinbefore defined may be used to label and thereby impart fluorescent properties to a target component. In particular, they may be used for multiple labelling and detection of biological molecules, such as nucleic acids, DNA, RNA, oligonucleotides, nucleotides, proteins, peptides, antibodies, etc. Thus, in a second aspect, there is provided a method for covalently labelling a component, the method comprising:

a) contacting said component with a compound of formula (I):

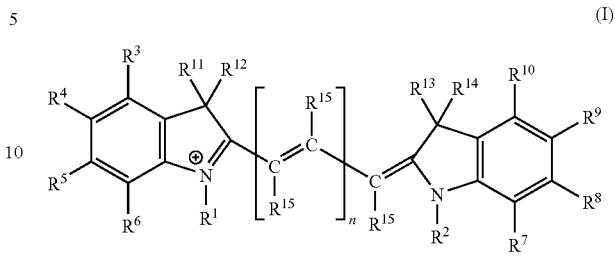

wherein:

the groups R$^1$, R$^2$, R$^{11}$, R$^{12}$, R$^{13}$ and R$^{14}$ are selected independently from -L-M, -L-P, $C_1$-$C_6$ alkyl and —$(CH_2)_k$—$SO_3H$, where k is an integer from 1 to 10;

the groups R$^3$, R$^4$, R$^5$, R$^6$, R$^7$, R$^8$, R$^9$ and R$^{10}$ are selected independently from hydrogen, -L-M, -L-P, —$SO_3H$, —$SO_2$—$CF_3$ and —$(CF_2)_m$—F, where m is 0 or an integer from 1 to 4; or R$^3$ taken in combination with R$^4$ or R$^5$ taken in combination with R$^6$ and/or R$^7$ taken in combination with R$^8$ or R$^9$ taken in combination with R$^{10}$ form a fused aromatic six-membered ring containing carbon atoms and being optionally substituted one or more times by —$SO_3H$, —$SO_2$—$CF_3$ or —$(CF_2)_m$—F, where m is hereinbefore defined;

L is a linking group having a chain from 1-20 linked atoms selected from the group consisting of carbon, nitrogen, oxygen and sulphur atoms;

M is a target bonding group;

P is a conjugated component;

the groups R$^{15}$ are hydrogen or two or more of R$^{15}$ groups are combined to form a one-ring or two-fused hydrocarbon ring system each ring having five or six carbon atoms, and remaining groups R$^{15}$ are hydrogen; and n is an integer from 1 to 3;

provided that:
i) at least one of groups R$^1$, R$^2$, R$^3$, R$^4$, R$^5$, R$^6$, R$^7$, R$^8$, R$^9$, R$^{10}$ R$^{11}$, R$^{12}$, R$^{13}$ and R$^{14}$ is -L-M;
ii) at least one of groups R$^3$, R$^4$, R$^5$, R$^6$, R$^7$, R$^8$, R$^9$ and R$^{10}$ comprises fluorine; and
iii) when any one of R$^3$, R$^4$, R$^5$, R$^6$, R$^7$, R$^8$, R$^9$ and R$^{10}$ is —$SO_3H$ at least one of groups R$^{11}$, R$^{12}$, R$^{13}$ and R$^{14}$ is selected from -L-M and —$(CH_2)_k$—$SO_3H$; and b) reacting said compound with said component such that said compound labels said component.

Preferably, at least one of groups R$^3$, R$^4$, R$^5$, R$^6$, R$^7$, R$^8$, R$^9$ and R$^{10}$ is fluorine.

Preferably, groups R$^{15}$ are hydrogen.

The target bonding group M is a group suitable for the formation of a covalent link between the compound of formula (I) and the target component, such as a reactive or functional group as hereinbefore defined. The method comprises incubating the component to be labelled with an amount of the compound according to the invention under conditions such that the dye becomes covalently bound to the component. Methods for the formation of dye conjugates or complexes with target components will be well known to the skilled person. For example, covalent labelling of proteins is typically performed in an aqueous buffered medium, suitably bicarbonate at pH 9.0, at ambient temperature for a period of typically 1 hour. The reaction is normally carried out in the dark. The labelled protein can be separated from any unreacted dye by size exclusion chromatography, for example using Sephadex™ as the stationary phase and phosphate buffer, pH 7.0 as the eluant. For multiple labelling of a target biomolecule, the ratio of the amount or concentration of dye to target material should be adjusted accordingly.

Suitable target components may include, but are not limited to the group consisting of antibody, lipid, protein, peptide, carbohydrate, nucleotides which contain or are derivatized to contain one or more of an amino, sulphydryl, carbonyl, hydroxyl, carboxylic acid and thiophosphate groups, and oxy or deoxy polynucleic acids which contain or are derivatized to contain one or more of an amino, sulphydryl, carbonyl, hydroxyl, carboxylic acid and thiophosphate groups, microbial materials, drugs, hormones, cells, cell membranes, toxins, polymer particles, and glass beads.

Components, for example proteins, labelled with the fluorescent dyes of the present invention may be used in in vitro assays to monitor cellular events, for example, uptake, transport, receptor binding, metabolism, signal transduction and protein-protein interactions, or to visualize cellular and molecular events in vivo. The dye-labelled components may be detected either directly or indirectly by an optical imaging procedure, for example using charge coupled device (CCD) detection. Suitable high-throughput sub-cellular imaging instrumentation is available, for example IN Cell Analyser 1000 and eXplore Optix™, In vivo Fluorescence Optical Imaging System (GE Healthcare). eXplore Optix™ is a trademark of ART Advanced Research Technologies Inc.

In addition to the foregoing one-step labelling process, the present invention also relates to two-step labelling processes in which, in a first step, a dye according to the present invention binds to, and thereby labels a primary component, such as an antibody, protein, DNA probe, etc. In the second step of the labelling process, the fluorescently labelled primary component is then used as a probe for detection of a secondary component, such as an antigen for which the antibody is specific.

The compounds of the present invention can also be used to determine the concentration of a particular protein or other component in a system. If the number of reactive groups on a protein which can react with a probe is known, the fluorescence per molecule can be known and the concentration of these molecules in the system can be determined by the total fluorescence intensity of the system. This particular method can be used to measure the concentration of various labelled analytes using microtitre plate readers or other known immunofluorescence detection systems. The concentration of fluorescently labelled material can also be determined using, for example, fluorescence polarization detection instruments.

The compounds of the present invention may also be used in a detection method wherein a plurality of the fluorescent dyes are covalently attached to a plurality of different primary components, such as antibodies, each primary component being specific for a different secondary component, such as an antigen, in order to identify each of a plurality of secondary components in a mixture of secondary components. According to this method of use, each of the primary components is separately labelled with a fluorescent dye having a different light absorption and emission wavelength characteristic, compared with the dye molecules used for labelling the other primary components. The labelled primary components are then added to the preparation containing secondary components, such as antigens, and the primary components are allowed to attach to the respective secondary components for which they are selective.

Any unreacted probe materials may be removed from the preparation by, for example, washing, to prevent interference with the analysis. The preparation is then subjected to a range of excitation wavelengths including the absorption wavelengths of particular fluorescent compounds. A fluorescence microscope or other fluorescence detection system, such as a flow cytometer or fluorescence spectrophotometer, having filters or monochromators to select the rays of the excitation wavelength and to select the wavelengths of fluorescence is next employed to determined the intensity of the emission wavelengths corresponding to the fluorescent compounds utilized, the intensity of fluorescence indicating the quantity of the secondary component which has been bound with a particular labelled primary component. Known techniques for conducting multi-parameter fluorescence studies include, for example, multiparameter flow cytometry. In certain cases a single wavelength of excitation can be used to excite fluorescence from two or more materials in a mixture where each fluoresces at a different wavelength and the quantity of each labelled species can be measured by detecting its individual fluorescence intensity at its respective emission wavelength. If desired, a light absorption method can also be employed.

The detection method of the present invention can be applied to any system in which the creation of a fluorescent primary component is possible. For example, an appropriately reactive fluorescent compound can be conjugated to a DNA or RNA fragment and the resultant conjugate then caused to bind to a complementary target strand of DNA or RNA. Appropriate fluorescence detection equipment can then be employed to detect the presence of bound fluorescent conjugates.

The present invention relates to intermediates and to methods suitable for preparing the dyes of formula (I). Thus, in a third aspect, there is provided a compound of formula (A):

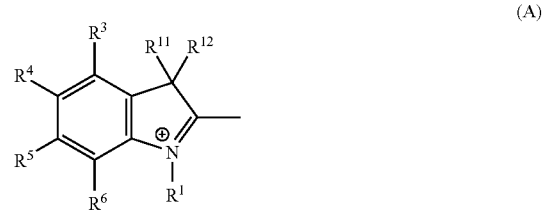

(A)

wherein:

the groups $R^1$, $R^{11}$ and $R^{12}$ are selected independently from -L-M, -L-P, $C_1$-$C_6$ alkyl and —$(CH_2)_k$—$SO_3H$, where k is an integer from 1 to 10;

the groups $R^3$, $R^4$, $R^5$ and $R^6$ are selected independently from hydrogen, -L-M, -L-P, —$SO_3H$, —$SO_2$—$CF_3$ and —$(CF_2)_m$—F, where m is 0 or an integer from 1 to 4; or $R^3$ taken in combination with $R^4$ or $R^5$ taken in combination with $R^6$ form a fused aromatic six-membered ring containing carbon atoms and being optionally substituted one or more times by —$SO_3H$, —$SO_2$—$CF_3$ or —$(CF_2)_m$—F, where m is hereinbefore defined;

L is a linking group having a chain from 1-20 linked atoms selected from the group consisting of carbon, nitrogen, oxygen and sulphur atoms;

M is a target bonding group; and

P is a conjugated component;

provided that:

i) at least one of groups $R^1$, $R^3$, $R^4$, $R^5$, $R^6$, $R^{11}$ and $R^{12}$ is -L-M or -L-P;

ii) at least one of groups $R^3$, $R^4$, $R^5$ and $R^6$ comprises fluorine; and iii) when any one of $R^3$, $R^4$, $R^5$ and $R^6$ is —$SO_3H$ at least one of groups $R^{11}$ and $R^{12}$ is selected from -L-M, -L-P and —$(CH_2)_k$—$SO_3H$.

In one embodiment, at least one of groups $R^1$, $R^{11}$ and $R^{12}$ is -L-M, where L is hereinbefore defined and M comprises a reactive group selected from succinimidyl ester, sulpho-succinimidyl ester, 4-sulfo-2,3,5,6-tetrafluorophenol (STP) ester, isothiocyanate, maleimide, haloacetamide, acid halide, hydrazide, vinylsulphone, dichlorotriazine and phosphoramidite.

In another embodiment, at least one of groups $R^1$, $R^{11}$ and $R^{12}$ is -L-M, where L is hereinbefore defined and M comprises a functional group selected from hydroxy, amino, sulphydryl, imidazole, carbonyl including aldehyde and ketone, carboxylic acid and thiophosphate.

Preferably, remaining groups $R^1$, $R^{11}$ and $R^{12}$ are selected $C_1$-$C_6$ alkyl and —$(CH_2)_k$—$SO_3H$, where k is an integer from 1 to 10. Preferably k is 3 or 4.

Preferably, at least one of groups $R^3$, $R^4$, $R^5$ and $R^6$ is fluorine. More preferably, at least two of groups $R^3$, $R^4$, $R^5$ and $R^6$ are F and any remaining groups $R^3$, $R^4$, $R^5$ or $R^6$ are selected from H, —$SO_2$—$CF_3$ and $CF_3$, preferably H. In particularly preferred embodiments, groups $R^3$, $R^4$, $R^5$ and $R^6$ are F.

Particular examples of compounds of formula (A) are those wherein:

at least one groups $R^1$ and $R^{11}$ is —$(CH_2)_k$—$SO_3H$;

remaining group $R^1$ or $R^{11}$ is selected from —$(CH_2)_5$—COOH and —$(CH_2)_k$—$SO_3H$;

group $R^{12}$ is $C_1$-$C_6$ alkyl, preferably methyl;

groups $R^3$, $R^4$, $R^5$ and $R^6$ are F; and k is 3 or 4.

Compounds according to the invention may be prepared by a process comprising:

a) reacting a first compound having the formula (A):

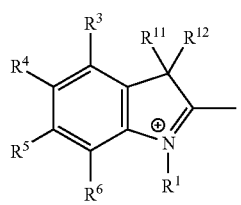

(A)

and b) a second compound which may be the same or different from the first compound and having the formula (B):

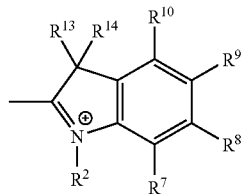

(B)

and c) a third compound (C) under conditions suitable for forming a conjugated linkage between said first and second compounds;

wherein:

the groups $R^1$, $R^2$, $R^{11}$, $R^{12}$, $R^{13}$ and $R^{14}$ are selected independently from -L-M -L-P, $C_1$-$C_6$ alkyl and —$(CH_2)_k$—$SO_3H$, where k is an integer from 1 to 10;

the groups $R^3$, $R^4$, $R^5$, $R^6$, $R^7$, $R^8$, $R^9$ and $R^{10}$ are selected independently from hydrogen, -L-M, -L-P, —$SO_3H$, —$SO_2$—$CF_3$ and —$(CF_2)_m$—F, where m is 0 or an integer from 1 to 4; or $R^3$ taken in combination with $R^4$ or $R^5$ taken in combination with $R^6$ and/or $R^7$ taken in combination with $R^8$ or $R^9$ taken in combination with $R^{10}$ form a fused aromatic six-membered ring containing carbon atoms and being optionally substituted one or more times by —$SO_3H$, —$SO_2$—$CF_3$ or —$(CF_2)_m$—F, where m is hereinbefore defined;

L is a linking group having a chain from 1-20 linked atoms selected from the group consisting of carbon, nitrogen, oxygen and sulphur atoms;

M is a target bonding group; and

P is a conjugated component;

provided that:

i) at least one of groups $R^1$, $R^2$, $R^3$, $R^4$, $R^5$, $R^6$, $R^7$, $R^8$, $R^9$, $R^{10}$ $R^{11}$, $R^{12}$, $R^{13}$ and $R^{14}$ is -L-M or -L-P;

ii) at least one of groups $R^3$, $R^4$, $R^5$, $R^6$, $R^7$, $R^8$, $R^9$ and $R^{10}$ comprises fluorine; and iii) when any one of $R^3$, $R^4$, $R^5$, $R^6$, $R^7$, $R^8$, $R^9$ and $R^{10}$ is —$SO_3H$ at least one of groups $R^{11}$, $R^{12}$, $R^{13}$ and $R^{14}$ is selected from -L-M, -L-P and —$(CH_2)_k$—$SO_3H$.

Preferably, at least one of groups $R^3$, $R^4$, $R^5$, $R^6$, $R^7$, $R^8$, $R^9$ and $R^{10}$ is fluorine.

Preferably, —$(CH_2)_k$—$SO_3H$ is selected from —$(CH_2)_3$—$SO_3H$ and —$(CH_2)_4$—$SO_3H$.

According to the method, intermediate compounds (A), (C) and (B) may be reacted either in a single step or in a multiple step process to form the compounds of formula (I). Symmetrical compounds of formula (I) wherein structures (A) and (B) are the same may be suitably prepared by reacting a compound of formula (A) (or (B) in two molar proportions with an appropriate bis-functional methine fragment containing 1, 3 or 5 carbon atoms, substituted with a group to form $R^{15}$ as hereinbefore defined. For example, a substituted N,N'-diphenylformamidine, or ortho ester will be employed as the third compound (C) for preparing trimethine cyanine dye analogues. In a corresponding manner, a suitably substituted malondialdehyde dianil may be employed for preparing the pentamethine cyanine dye analogues and a glutaconic aldehyde for preparing heptamethine cyanine dye analogues. The reaction is usually carried out in an organic solvent, such as pyridine and heated to reflux. The mixture subsequently is cooled and poured into an organic solvent such as ether. The resulting solid or semi-solid may be purified by chromatography on a silica gel column using a series of methanol/chloroform solvents. Alternatively, purification may be achieved using a reverse phase column with an eluant consisting of water containing 0.1% TFA/acetonitrile.

Unsymmetrical compounds of formula (I) wherein structures (A) and (B) are different may be conveniently prepared in a two step process. In this process, an intermediate compound is first formed by reacting an indolinium compound of formula (A) with a compound suitable for forming the linkage, for example, a suitably substituted N,N'-diphenylformamidine, or malonaldehyde dianil, in the presence of acetic anhydride, to form a 2-anilinovinyl or 4-anilino-1,3-butadienyl quaternary salt. The intermediate quaternary salt may be reacted with a second 2-methyl indolinium quaternary salt to give a compound of formula (I). Alternative intermediates for forming the polymethine linkage joining the heterocyclic ring systems are known and are described, for example in Hamer, F. M., "The Cyanine Dyes and Related Compounds", Interscience (1964).

EXAMPLES

Below, the present invention will be described by way of examples, which are provided for illustrative purposes only and accordingly are not to be construed as limiting the scope of the present invention as defined by the appended claims. All references given below and elsewhere in this application are hereby included herein by reference.

1. 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium (Cy5F) (Compound 1)

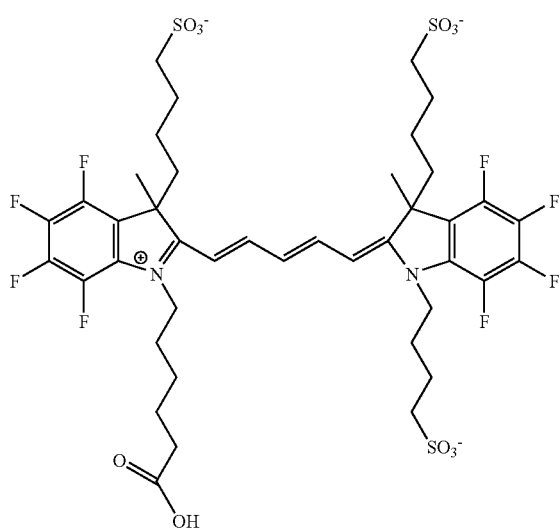

1.1 5-(Ethoxycarbonyl)-5-methyl-6-oxoheptane-1-sulphonate, sodium salt

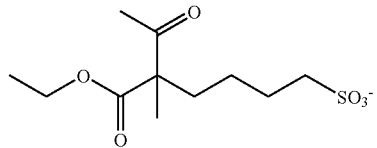

Sodium hydride (60 wt %, 12 g≡0.3 mol NaH) was slurried in dry DMF (100 ml). The resulting suspension was cooled with stirring to 0° C. To this was added a solution of ethyl 2-methylacetoacetate (50 g, 0.346 mol) in DMF (25 ml), dropwise so as to maintain the temperature at <10° C. and control effervescence. Once addition was complete and hydrogen evolution ceased, the mixture was warmed in a warm water bath until a clear, pale yellow solution resulted. This was cooled again to 0° C. A solution of 1,4-butanesultone (45 g, 0.33 mol) in DMF (25 ml) was added over 15 mins, maintaining the temperature at <10° C. Once addition was complete, the mixture was heated at 50° C. for 16 hrs. The solvent was then evaporated under vacuum to dryness; the residue was partitioned between water and diethyl ether. The aqueous layer was retained; the organic layer was extracted with fresh water, then discarded. The combined aqueous extracts were washed with fresh ether, then evaporated under vacuum to give the product as a waxy solid.

δH (270 MHz; D$_2$O) 4.23 (2H, q), 2.9 (2H, app t), 2.26 (3H, s), 2.0-1.6 (6H, m), 1.36 (3H, s) and 1.26 (3H, t).

1.2 5-Methyl-6-oxoheptane-1-sulphonic acid

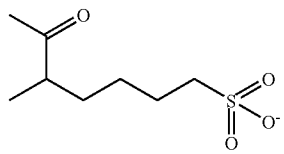

5-(Ethoxycarbonyl)-5-methyl-6-oxoheptane-1-sulphonate, sodium salt (from 1.1) was heated at 90° C. in concentrated hydrochloric acid (200 ml), until TLC indicated complete reaction (~3 hrs). The solvent was then evaporated under vacuum; the residue was purified by flash chromatography (Silica. Ethanol/dichloromethane mixtures) to give 49.6 g of 5-methyl-6-oxoheptane-1-sulphonic acid.

δH (270 MHz; D$_2$O) 2.9 (2H, app t), 2.68 (1H, m), 2.2 (3H, s), 1.8-1.3 (6H, m) and 1.18 (3H, d).

1.3 2,3-Dimethyl-3-(4-sulfobutyl)-4,5,6,7-tetrafluoro-3H-indole, disodium salt

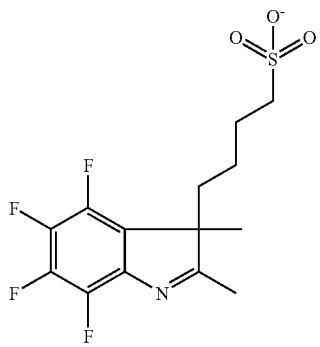

2,3,4,5-Tetrafluoro-aniline (1.75 g, 0.01M) was dissolved in conc. HCl (280 ml). The flask was maintained at −10° C. and a solution of NaNO$_2$ (1 eq) in water (10 ml) added dropwise followed subsequently by a solution of tin(II) chloride (3.4 g) in conc. HCl (40 ml). The reaction was returned to ambient temperature and stirred for 1 hr. The solvent was removed in vacuo to yield the crude product as a yellow salt (7 g).

The hydrazine salts and crude material were dissolved in acetic acid (50 ml) with the sulfonated ketone, 5-methyl-6-oxoheptane-1-sulphonic acid (6 g). The solution was heated at 140° C. for 2 hrs to yield an orange solution with fine orange precipitate. The solvent was evaporated to yield a brown gum. The product was isolated by reverse phase HPLC (0.1% TFA, water/acetonitrile gradient) to yield the product. $MH^+=354$.

1.4 1-(5-Carboxypentyl)-2,3-dimethyl-3-(4-sulfobutyl)-4,5,6,7-tetrafluoro-3H-indolium

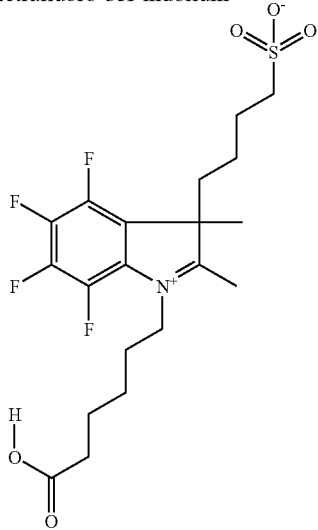

Tetra-fluorinated indole (from 1.3) (150 mg, $4.2\times10^{-4}$ mol, 1 eq.) was heated at 140° C. with bromo-hexanoic acid (15 g, 0.073 mol, 260 eq) for 24 hr under nitrogen. The product was triturated with diethyl ether and dried under vacuum to yield a brown mass. The major component was confirmed as 1-(5-carboxypentyl)-2,3-dimethyl-3-(4-sulfobutyl)-4,5,6,7-tetrafluoro-3H-indolium [4] by LC-MS and was used without further purification. $MH^+=470$.

1.5 2,3-Dimethyl-4,5,6,7-tetrafluoro-1,3-bis(4-sulphonatobutyl)-3H-indolium, disodium salt

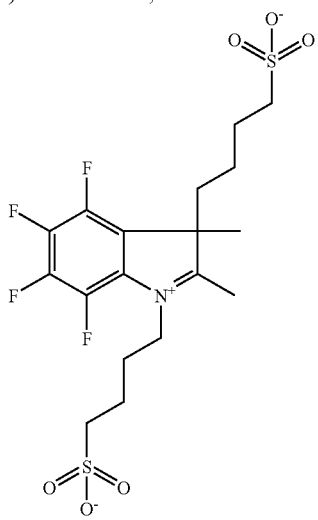

Tetra-fluorinated indole from 1.3 (100 mg, $2.8\times10^{-4}$ mol, 1 eq.) was heated at 140° C. with butane sultone (10 g, 0.073 mol) for 24 hr under nitrogen. The product was triturated with diethyl ether and dried under vacuum to yield a brown mass. The major component was confirmed as 2,3-dimethyl-4,5,6,7-tetrafluoro-1,3-bis(4-sulphonatobutyl)-3H-indolium, disodium salt by LC-MS and was used without further purification. $M^+=490$.

1.6 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium (Cy5F) (Compound 1)

Alkylated indolenines (from 1.4 (5 mg) and 1.5 (1 eq.)) were dissolved in ethanol and pyridine (250 μl). 1,1,1-Trimethoxypropene (1 eq.) was added and the solution stirred for two hours. Analysis by reverse phase LC-MS observed three 650 nm absorbing products, nominally the two symmetrical dyes and the desired product. The asymmetrical desired product was isolated by HPLC and analysed by mass spectroscopy. Maldi-TOF $MH^+=993$. Abs $\lambda_{max}=644$ nm (Aq). Em $\lambda_{max}=659$ nm. LC-MS indicates the main peak at 993 m/z for both isomers. HPLC-DAD gives >98% at 643 nm with peak purity >99%.

1.7 2-{(1E,3E,5E)-5-[1-{6-[(2,5-Dioxopyrrolidin-1-yl)oxy]-6-oxohexyl}-4,5,6,7-tetrafluoro-3-methyl-3-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium (Cy5F NHS ester)

Cy5F free acid (500 μg) was dissolved in dimethyl-sulfoxide (500 μl) containing diisopropylethylamine (4% v/v) (20 μl). An aliquot of this solution (1 μl) was retained as a control. Dipyrrolidino-(N-succinimidyloxy)carbenium hexafluorophosphate (1 mg) was added and the solution agitated for 1 hour prior to analysis by TLC (Merck RP-18$_{F254}$, 1:1 water:acetonitrile+0.1% v/v TFA). Total conversion of the starting material (Rf 0.4) to a new product spot (Rf 0.36) was observed. The product (Cy5F NHS ester) was used immediately for antibody conjugation without further purification.

1.8 Antibody Conjugation

Affinity purified Goat Anti-Mouse antibody IgG (100 μg) (Rockland Inc. Catalogue No. 610-101-121) was transferred to a pre-soaked Slide-A-Lyzer® dialysis cassette (Pierce Biotechnology; 10 K MW cutoff) and dialysed (0.1 M NaHCO$_3$ buffer, pH 9.2). The dialysed product was mixed with Cy5F NHS ester (from 1.7) (49 μl of a 1 mg/ml solution) and stirred at room temperature for 1 h. The reaction mixture was transferred to a pre-soaked Slide-A-Lyzer® dialysis cassette (Pierce Biotechnology; 10 K MW cutoff) and dialyzed (0.1 M PBS-pH 7.2; 2×2 l) at 4° C. for 48 h. The presence of dye-labeled antibody post dialysis was determined by UV/Vis. spectroscopy, $\lambda_{max}$ 645 nm, A=0.3 AU.

2. 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3-5-trienyl}-4,5,6,7-tetrafluoro-3-methyl-1,3-bis(4-sulfobutyl)-3H-indolium (Cy7F) (Compound 2)

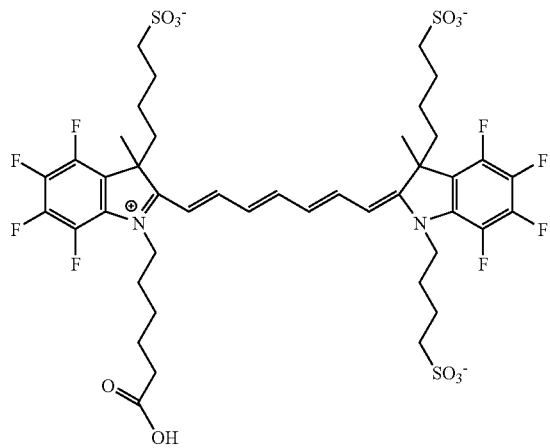

2.1 Alkylated indole (from 1.5) (0.1 mmol) and N-[5-(phenylamino)-2,4-pentadienylidene (Aldrich) (0.06 mmol) were heated for 30 minutes at 120° C. in a 1:1 mixture of acetic acid and acetic anhydride (1.5 ml). This was cooled to ambient temperature and alkylated indole (from 1.4) was added (0.07 mmol) with potassium acetate (8 eq.). The mixture was stirred at 40° C. overnight, whereby a dark green solution was observed. The cooled solution was purified by HPLC (5-95% (Acetonitrile (0.1% TFA) gradient in water (0.1% TFA). Two isomeric products were identified ($R_T$=7.98 m and 8.5 min) by LC-MS both with m/z=1019 (M+1).

3. 3-(5-Carboxypentyl)-3-methyl-5-sulfo-1-(4-sulfobutyl)-2-{1E,3E,5E}-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 3)

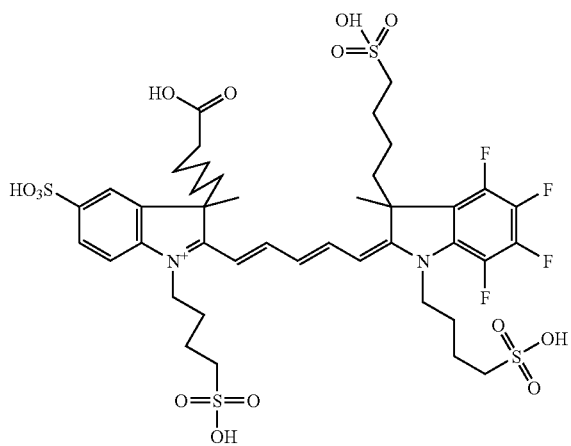

3.1 3-(Carboxypentyl)-2,3-dimethylindolenine-5-sulfonic acid

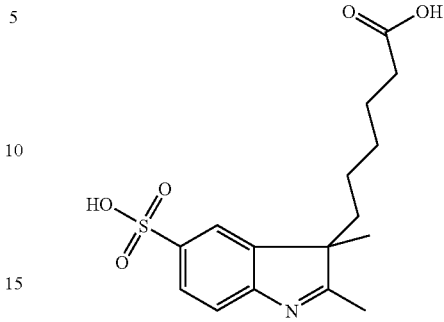

4-Hydrazinobenzenesulfonic acid (13.42 g, 71.4 mmol) was added to 7-methyl-8-oxononanoic acid (20 g, ~107 mmol) in a 1 l round bottomed flask, together with acetic acid (71 ml). The pink suspension was stirred at 140° C. for 5 hours. The reaction mixture was rotary evaporated to yield a red/brown oil. The oil was triturated with diethyl ether (4×50 ml) to produce a semi-solid sticky mass. This was dissolved in water (200 ml) and purified by flash chromatography. The product was eluted with 10% acetonitrile/water+0.1% TFA as a yellow band. HPLC analysis showed the yellow band to be of adequate purity and separated from the major impurity at 23.5 minutes. Yield 18 g.

3.2 2,3-Dimethyl-3-(5-carboxypentyl)-5-sulfo-1-(3-sulfobutyl)indolium, disodium salt

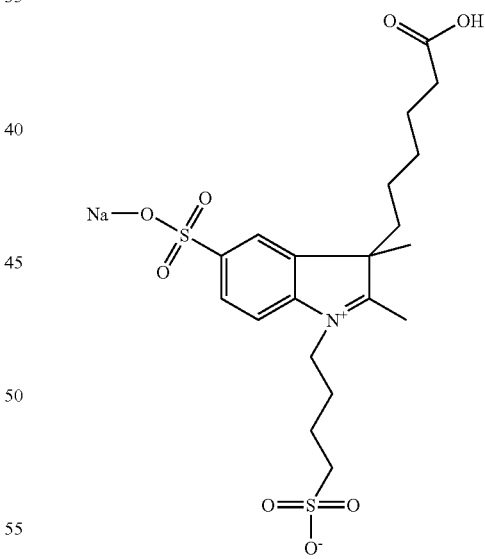

3-(Carboxypentyl)-2,3-dimethylindolenine-5-sulfonic acid (from 3.1) (5 g, 14.5 mmol) and sodium acetate (1.55 g, 19.2 mmol) were dissolved in methanol (~30 ml) and the mixture was stirred for 5 minutes. The mixture was then rotary evaporated three times from methanol to produce a yellow fluffy solid. Butane sultone (10 g, 5 eq) in sulfolan (50 ml) was added and the mixture heated with stirring for 4 hours at 150° C. A red solid was deposited on the bottom of the flask. A sample of the red solid was analysed by reverse phase (C18)

HPLC (Jupiter 10μ $C_{18}$ 4.6 mm×250 mm) with 100% water (0.1% TFA) to 50% acetonitrile (0.1% TFA) over 30 minutes and UV detection at 274 nm. The reaction mixture was allowed to cool and stored at +2° C. The reaction mixture was warmed and poured into stirring diethyl ether (500 ml), the ether was decanted off to leave a pink solid that was isolated.

3.3 2,3-Dimethyl-4,5,6,7-tetrafluoro-1,3-bis(4-sulphonatobutyl)-3H-indolium, disodium salt

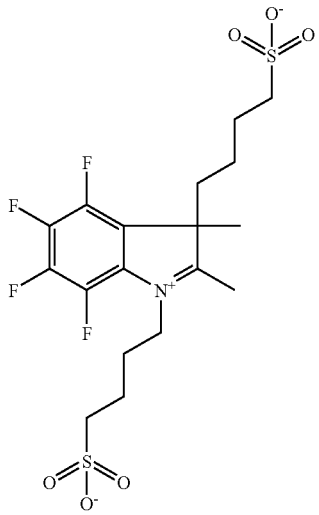

Tetra-fluorinated indole (from 1.3) (100 mg, 2.8×10−4 mol, 1 eq.) was heated at 140° C. with butane sultone (10 g, 0.073 mol) for 24 hr under nitrogen. The product was triturated with diethyl ether and dried under vacuum to yield a brown mass. The major component was confirmed as (1.5) by LC-MS and was used without further purification. $M^+=491$.

3.4 3-(5-Carboxypentyl)-3-methyl-5-sulfo-1-(4-sulfobutyl)-2-{1E,3E,5E}-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 3)

2,3-Dimethyl-3-(5-carboxypentyl)-5-sulfo-1-(3-sulfobutyl)indolium, disodium salt (from 3.2) (3.4 g, 6.84 mmol) was dissolved in acetic acid (25 ml) containing triethylamine (2.5 ml). Malonaldehyde bisphenylimine HCl (4.15 g, 16 mmol) was added and the mixture heated at 140° C. with stirring overnight. The reaction mixture was rotary evaporated to yield a red oil which was dissolved in water (50 ml) and acetonitrile (30 ml). This was filtered and purified to yield 1 g of dye intermediate. 24 mg (3.9×10−5 mol, 4.9 molar equiv.) was dissolved in 1 ml solution of acetic acid:acetic anhydride 1:1 v/v to form a bright red solution. 2,3-Dimethyl-4,5,6,7-tetrafluoro-1,3-bis(4-sulphonatobutyl)-3H-indolium, disodium salt (4 mg, 8.12×10−6 mol) and potassium acetate (50 mg), were added and the reaction was stirred at 120° C. for 1 hour. The crude blue/green material was purified by reverse phase preparative HPLC to yield an intense blue product. Rotary evaporation and freeze drying resulted in 1 mg blue solid (12% yield). $M^+=1000.67$.

4. 1-(5-Carboxypentyl)-3-methyl-5-sulfo-3-(4-sulfobutyl)-2-{(1E,3E,5E)-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 4)

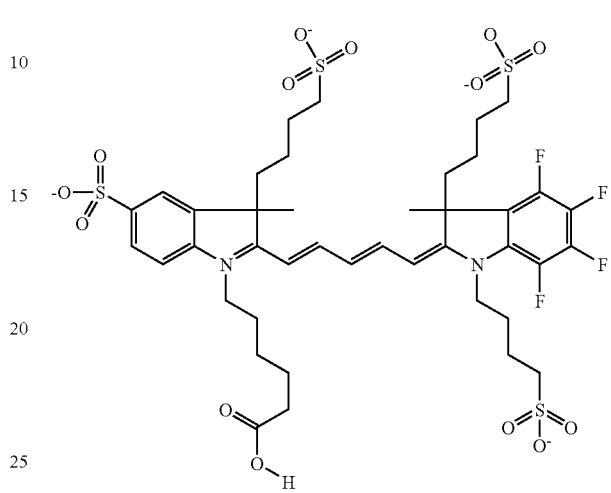

4.1 Dye Intermediate

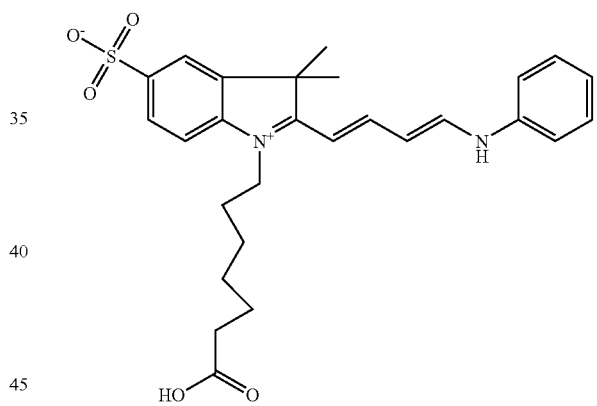

1-(Carboxypentynyl)-2,3,3-trimethyl-indoleninium-5-sulfonate (900 mg, 1.91 mmol), malonaldehyde bisphenylimine (320 mg, 1.24 mmol, 0.9 eq), acetic anhydride (12 ml) and acetic acid (6 ml) were heated at 120° C. for 1 hour. The red/orange mixture was allowed to cool. UV and HPLC analysis show the reaction to have gone to completion. The material was used in the following stage (4.2) without further analysis.

4.2 1-(5-Carboxypentyl)-3-methyl-5-sulfo-3-(4-sulfobutyl)-2-{(1E,3E,5E)-5-[4,5,6,7-tetrafluoro-3-methyl-1,3-bis(4-sulfobutyl)-1,3-dihydro-2H-indol-2-ylidene]penta-1,3-dienyl}-3H-indolium (Compound 4)

2,3-Dimethyl-3-(5-carboxypentyl)-5-sulfo-1-(3-sulfobutyl)indolium, disodium salt (5 mg) was added to the dye intermediate from 5.1 (50 mg/ml, 100 μl) and potassium acetate (8 mg, 8 eq.). The reaction was stirred at room temperature overnight to yield a deep blue solution. The product was isolated by reverse phase HPLC (acetonitrile/water/0.1% trifluoroacetic acid). $M+=879$. UV/Vis $\lambda_{max}$ 647 nm. Yield 4.5 mg.

5. 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,6-difluoro-3-methyl-1,3-bis(4-sulfobutyl)-3H-indolium (Compound 5)

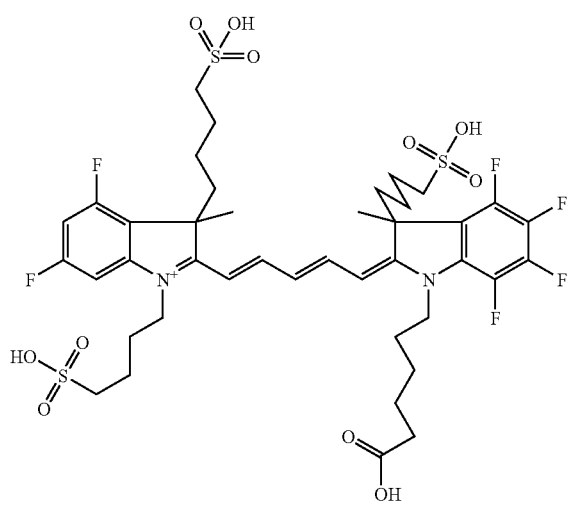

5.1 4,6-Difluoro-2,3-dimethyl-3-(4-sulfobutyl)-3H-indole

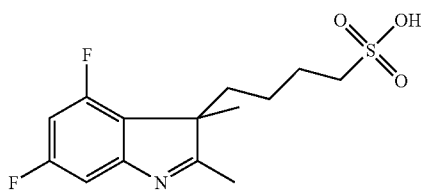

To 3,5-difluorophenyl hydrazine hydrochloride (1 g) in acetic acid (20 ml) was added 5-methyl-6-oxoheptane-1-sulphonic acid (1.6 g) and the solution heated to reflux overnight. The volatiles were removed on a rotary evaporator to give the crude product, 50 mg of which was purified by preparative HPLC. The relevant fractions were combined, concentrated on a rotary evaporator and freeze dried to give the desired product (19 mg). $M^+=317$

5.2 4,6-Difluoro-2,3-dimethyl-1,3-bis(4-sulfobutyl)-3H-indolium

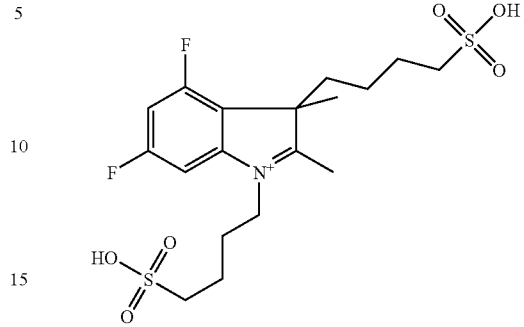

To 4,6-difluoro-2,3-dimethyl-3-(4-sulfobutyl)-3H-indole (1 g of non purified material) was added butane sultone (10 ml) and the solution heated to 140° C. for 2 days. On cooling, the product was extracted into water and purified by preparative HPLC. The relevant fractions were combined, concentrated on a rotary evaporator and freeze dried to give the desired product (90 mg). $M^+=454$

5.3 6-[(2E)-4,5,6,7-Tetrafluoro-3-methyl-2-[(2E,4E)-4-(phenylimino)but-2-enylidene]-3-(4-sulfobutyl)-2,3-dihydro-1H-indol-1-yl]hexanoic acid

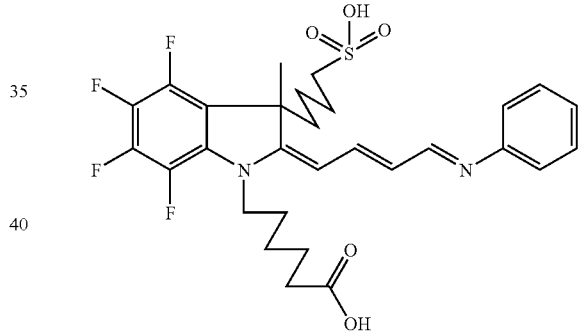

To 1-(5-carboxypentyl)-4,5,6,7-tetrafluoro-3-methyl-3-(4-sulfobutyl)-3H-indolium (12 mg) was added malonaldehyde bis(phenylimine) monohydrochloride (7 mg), acetic anhydride (2 ml) and acetic acid (1 ml). This mixture was heated to 120° C. for 1 hour 50 minutes after which time it was cooled to room temperature. This crude reaction mixture (ca. 5 mg/ml product) was used without purification as further described.

5.4 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,6-difluoro-3-methyl-1,3-bis(4-sulfobutyl)-3H-indolium (Compound 5)

To 6-[(2E)-4,5,6,7-tetrafluoro-3-methyl-2-[(2E,4E)-4-(phenylimino)but-2-enylidene]-3-(4-sulfobutyl)-2,3-dihydro-1H-indol-1-yl]hexanoic acid (0.4 ml of ca. 5 mg/ml) was added 4,6-difluoro-2,3-dimethyl-3-(4-sulfobutyl)-3H-indole (2 mg) and potassium acetate (4.4 mg). On agitation overnight, preparative HPLC was performed, the relevant fractions were combined, concentrated on a rotary evaporator and freeze dried to give the desired product (4 mg). $M+=957$

6. 2-{(1E,3E,5E)-5-[1-(5-Carboxypentyl)-4,6-difluoro-3,3-dimethyl-1,3-dihydro-2H-indol-2-ylidene]penta-1,3-dienyl}-4,5,6,7-tetrafluoro-3-methyl-1,3-bis(4-sulfobutyl)-3H-indolium (compound 6)

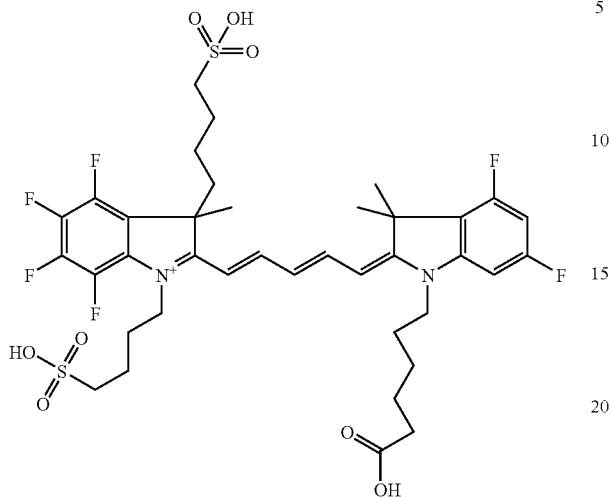

6.1 4,6-Difluoro-2,3,3-trimethyl-3H-indole

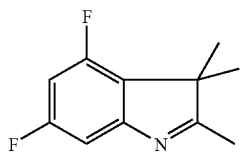

To 3,5-difluorophenyl hydrazine hydrochloride (2.6 g) in ethanol (30 ml) was added 3-methyl-2-butanone (6 ml) and the solution heated to 78° C. for 3 hours. After this time the mixture was cooled and the volatiles removed on a rotary evaporator to give a red solid. To this was added polyphosphoric acid (10 g) and acetic acid (25 ml). This mixture was heated to 120° C. for 3 hours and then left to cool overnight. The volatiles were removed on a rotary evaporator and the pH adjusted to pH5.5 by the addition of sodium hydroxide to give the crude product which was purified by flash chromatography (silica gel/hexane/ethyl acetate). The relevant fractions were combined and concentrated on a rotary evaporator to give the desired product (2 g). $MH^+=196$

6.2 1-(5-Carboxypentyl)-4,6-difluoro-2,3,3-trimethyl-3H-indolium

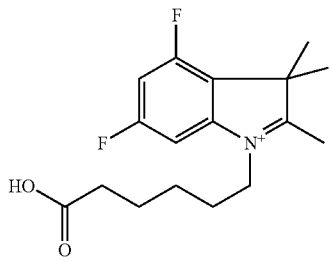

To 4,6-difluoro-2,3,3-trimethyl-3H-indole (2 g) was added 6-bromohexanoic acid (5 g) and sulfolan (5 ml) and the mixture heated to 140° C. for 5 hours. On cooling the mixture was diluted with water and preparative HPLC performed to give the desired product (1.4 g). $M^+=310$

6.3 6-[(2E)-4,6-Difluoro-3,3-dimethyl-2-[(2E,4E)-4-(phenylimino)but-2-enylidene]-2,3-dihydro-1H-indol-1-yl]hexanoic acid

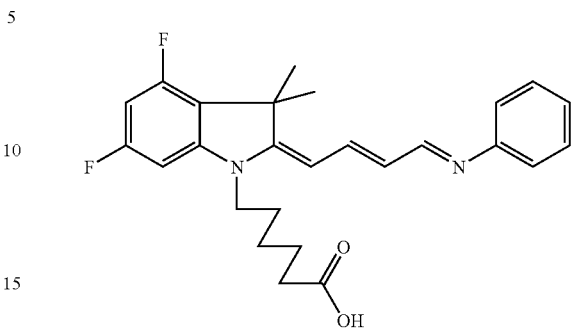

To 1-(5-carboxypentyl)-4,6-difluoro-2,3,3-trimethyl-3H-indolium (50 mg) was added malonaldehyde bis(phenylimine) monohydrochloride (37.6 mg), acetic anhydride (2 ml) and acetic acid (1 ml). This mixture was heated to 120° C. for 1 hour after which time it was cooled to room temperature. This crude reaction mixture (ca. 32 mg/ml product) was used without purification as further described.

6.4 2-{(1E,3E,5E)-5-[1-(5-Carboxypentyl)-4,6-difluoro-3,3-dimethyl-1,3-dihydro-2H-indol-2-ylidene]penta-1,3-dienyl}-4,5,6,7-tetrafluoro-3-methyl-1,3-bis(4-sulfobutyl)-3H-indolium (Compound 6)

To 6-[(2E)-4,6-difluoro-3,3-dimethyl-2-[(2E,4E)-4-(phenylimino)but-2-enylidene]-2,3-dihydro-1H-indol-1-yl]hexanoic acid (0.04 mmol) was added 4,5,6,7-tetrafluoro-2,3-dimethyl-1,3-bis(4-sulfobutyl)-3H-indolium (19.6 mg) and potassium acetate (35 mg). On agitation overnight, preparative HPLC was performed, the relevant fractions were combined, concentrated on a rotary evaporator and freeze dried to give the desired product (6 mg). $M^+=835$

6.5 2-[(1E,3E,5E)-5-(1-{6-[(2,5-Dioxopyrrolidin-1-yl)oxy]-6-oxohexyl}-4,6-difluoro-3,3-dimethyl-1,3-dihydro-2H-indol-2-ylidene)penta-1,3-dienyl]-4,5,6,7-tetrafluoro-3-methyl-1,3-bis(4-sulfobutyl)-3H-indolium

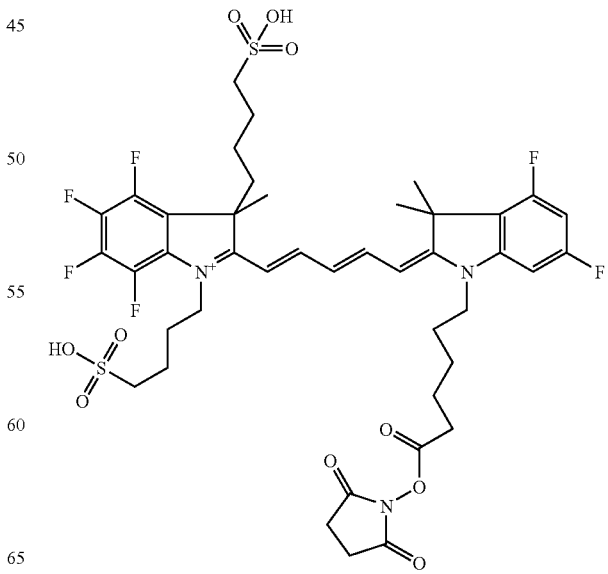

To 2-{(1E,3E,5E)-5-[1-(5-carboxypentyl)-4,6-difluoro-3,3-dimethyl-1,3-dihydro-2H-indol-2-ylidene]penta-1,3-dienyl}-4,5,6,7-tetrafluoro-3-methyl-1,3-bis(4-sulfobutyl)-3H-indolium (2 mg) was added DMSO (1 ml), dipyrrolidino-(N-succinimidyloxy)carbenium hexafluorophosphate (4 mg) and diisopropyl ethylamine (40 ul). After agitation for 3 hours, the reaction mixture subjected to preparative HPLC to give the desired product (0.4 mg). M+=932

7. 1-(5-Carboxypentyl)-2-{(1E,3E,5E)-5-[1-(5-carboxypentyl)-4,6-difluoro-3,3-dimethyl-1,3-dihydro-2H-indol-2-ylidene]penta-1,3-dienyl}-4,5,6,7-tetrafluoro-3-methyl-3-(4-sulfobutyl)-3H-indolium (Compound 7)

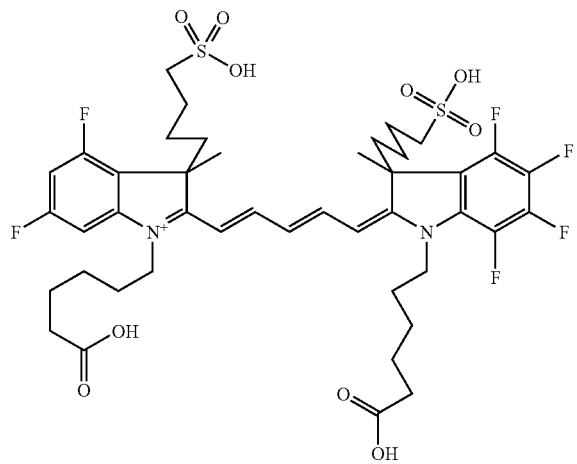

7.1 1-(5-Carboxypentyl)-4,6-difluoro-2,3-dimethyl-3-(4-sulfobutyl)-3H-indolium

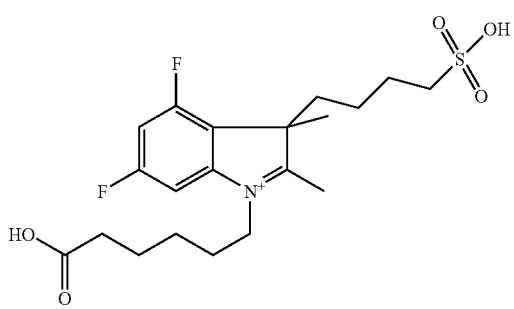

To 4,6-difluoro-2,3-dimethyl-3-(4-sulfobutyl)-3H-indole (0.8 g of non purified material) was added 6-bromohexanoic acid (1.6 g) and the solution heated to 140° C. for 2 days. On cooling, the product was diluted with acetonitrile and purified by preparative HPLC in two shots. The relevant fractions were combined, concentrated on a rotary evaporator and freeze dried to give the desired product (110 mg). M+=432

7.2 1-(5-Carboxypentyl)-2-{(1E,3E,5E)-5-[1-(5-carboxypentyl)-4,6-difluoro-3,3-dimethyl-1,3-dihydro-2H-indol-2-ylidene]penta-1,3-dienyl}-4,5,6,7-tetrafluoro-3-methyl-3-(4-sulfobutyl)-3H-indolium (Compound 7)

To 6-[(2E)-4,5,6,7-tetrafluoro-3-methyl-2-[(2E,4E)-4-(phenylimino)but-2-enylidene]-3-(4-sulfobutyl)-2,3-dihydro-1H-indol-1-yl]hexanoic acid (0.7 ml of ca. 5 mg/ml) was added 1-(5-carboxypentyl)-4,6-difluoro-2,3-dimethyl-3-(4-sulfobutyl)-3H-indolium (2.8 mg) and potassium acetate (6 mg). On agitation overnight, preparative HPLC was performed, the relevant fractions were combined, concentrated on a rotary evaporator and freeze dried to give the desired product (1.6 mg). M+=936

8. 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sulfobutyl)-5-[(trifluoromethyl)sulfonyl]-3H-indolium (Compound 8)

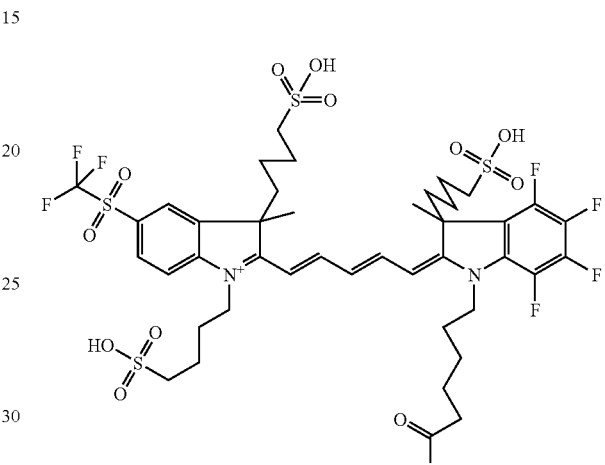

8.1 4-(Trifluoromethylthio)phenylhydrazine

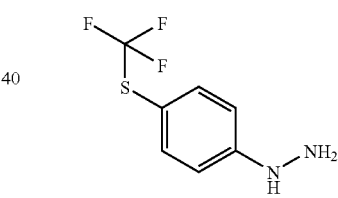

To 4-(trifluoromethylthio)aniline (5 g) was added cHCl (300 ml). At between 0° C. and −5° C. was added sodium nitrite (2.5 g) in water (50 ml) over 15 min. After a further 25 min at this temperature the mixture was filtered and tin (II) chloride dihydrate added to the solution over 5 min. The mixture was allowed to warm to room temperature with stirring overnight. The resulting precipitate was filtered to give a white solid (3.3 g). M+=208

8.2 5-(Trifluoromethylthio)-2,3-dimethyl-3-(4-sulfobutyl)-3H-indole

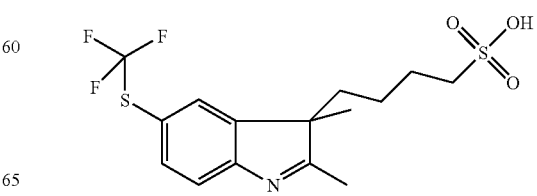

To 4-(trifluoromethylthio)phenylhydrazine (1 g) in acetic acid (40 ml) was added 5-methyl-6-oxoheptane-1-sulphonic acid (1.4 g) and the solution heated to reflux overnight. The volatiles were removed on a rotary evaporator to give the crude product, 1.1 g of which was purified by preparative HPLC. The relevant fractions were combined, concentrated on a rotary evaporator and freeze dried to give the desired product (260 mg). $M^+=381$ 8.3 5-(Trifluoromethylthio)-2,3-dimethyl-1,3-bis(4-sulfobutyl)-3H-indolium

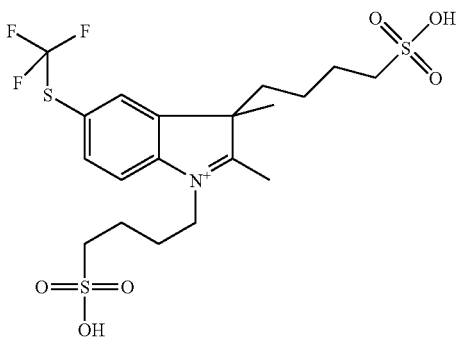

To 5-(trifluoromethylthio)-2,3-dimethyl-3-(4-sulfobutyl)-3H-indole (36 mg) was added butane sultone (2 ml) and the solution heated to 140° C. overnight. On cooling, the product was extracted into water and purified by preparative HPLC. The relevant fractions were combined, concentrated on a rotary evaporator and freeze dried to give the desired product (15 mg). M+=518

8.4 5-(Trifluoromethylsulfonyl)-2,3-dimethyl-1,3-bis(4-sulfobutyl)-3H-indolium

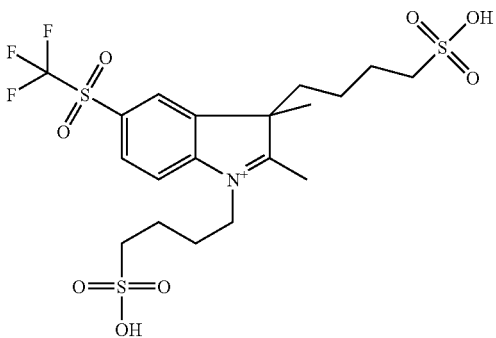

To 5-(trifluoromethylthio)-2,3-dimethyl-1,3-bis(4-sulphonatobutyl)-3H-indolium (4 mg) was added concentrated sulphuric acid (0.4 ml) and chromium trioxide (5 mg). After 60 min the mixture was diluted with water and purified by preparative HPLC. The relevant fractions were combined, concentrated on a rotary evaporator and freeze dried to give the desired product (1 mg). $M^+=550$ 8.5 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sulfobutyl)-5-[(trifluoromethyl)sulfonyl]-3H-indolium (Compound 8)

To 6-[(2E)-4,5,6,7-tetrafluoro-3-methyl-2-[(2E,4E)-4-(phenylimino)but-2-enylidene]-3-(4-sulfobutyl)-2,3-dihydro-1H-indol-1-yl]hexanoic acid (0.21 ml of ca. 5 mg/ml) was added 5-(trifluoromethylsulfonyl)-2,3-dimethyl-1,3-bis (4-sulphonatobutyl)-3H-indolium (1 mg) and potassium acetate (4 mg). On agitation overnight, preparative HPLC was performed, the relevant fractions were combined, concentrated on a rotary evaporator and freeze dried to give the desired product (0.1 mg). $M^+=1054$ 9. 2-{(1E,3E,5E)-5-[1-(4-Sulfobutyl)-4,6-bis(trifluoromethyl)-3-methyl-3-(5-carboxypentyl))-1,3-dihydro-2H-indol-2-ylidene]penta-1,3-dienyl}-4,6-difluoro-3-methyl-1,3-bis(4-sulfobutyl)-3H-indolium (compound 9)

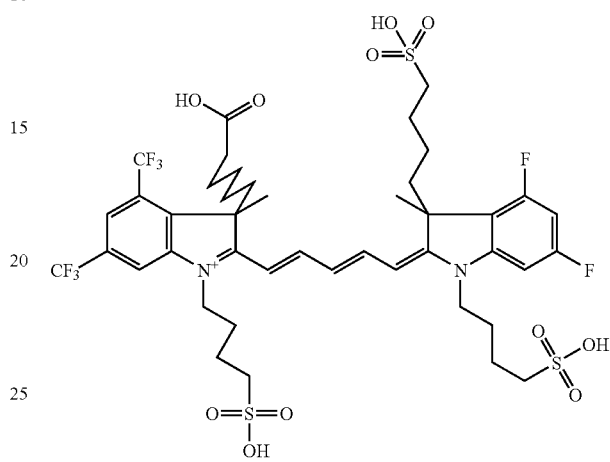

9.1 4,6-Bis(trifluoromethyl)-2,3-dimethyl-3-(5-carboxypentyl)-3H-indole

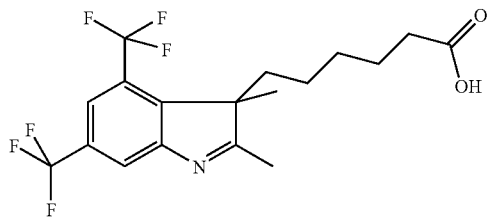

To 3,5-bis(trifluoromethyl)phenyl hydrazine hydrochloride (1 g) in acetic acid (20 ml) was added 7-methyl-8-oxononanoic acid (0.66 g) and the solution heated to reflux for 5 hours. The volatiles were removed on a rotary evaporator to give the crude product, 1 ml of which was purified by preparative HPLC. The relevant fractions were combined, concentrated on a rotary evaporator and freeze dried to give the desired product (17 mg). $M^+=395$ 9.2 3-(5-Carboxypentyl)-4,6-bis(trifluoromethyl)-2,3-dimethyl-1-(4-sulfobutyl)-3H-indolium

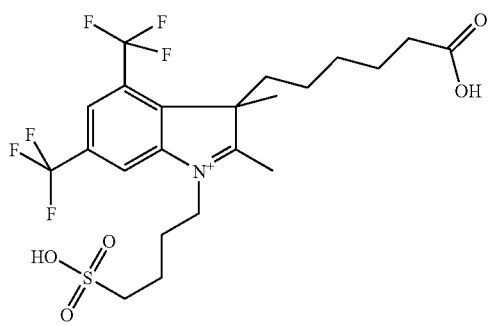

To 4,6-bis(trifluoromethyl)-2,3-dimethyl-3-(5-carboxypentyl)-3H-indole (300 mg of non purified material) was added butane sultone (3 ml) and the solution heated to 140° C. for 1 day. On cooling, the product was extracted into water and purified by preparative HPLC. The relevant fractions were combined, concentrated on a rotary evaporator and freeze dried to give the desired product (19 mg). $M^+=532$ 9.3 2-{(1E,3E,5E)-5-[1-(4-Sulfobutyl)-4,6-Bis(trifluoromethyl)-3-methyl-3-(5-carboxypentyl))-1,3-dihydro-2H-indol-2-ylidene]penta-1,3-dienyl}-4,6-difluoro-3-methyl-1,3-bis(4-sulfobutyl)-3H-indolium (Compound 9)

To 3-(5-carboxypentyl)-4,6-bis(trifluoromethyl)-2,3-dimethyl-1-(4-sulfobutyl)-3H-indolium (3.7 mg) was added malonaldehyde bis(phenylimine) monohydrochloride (1.6 mg), acetic anhydride (0.5 ml) and acetic acid (0.25 ml). This mixture was heated at 120° C. for 1 hour and then cooled to room temperature. 4,6-Difluoro-2,3-dimethyl-1,3-bis(4-sulfobutyl)-3H-indolium (3.15 mg) and potassium acetate (6.1 mg) was added. On agitation overnight, preparative HPLC was performed, the relevant fractions were combined, concentrated on a rotary evaporator and freeze dried to give the desired product (0.5 mg). $M^+=1021$ 10. 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sulfobutyl)-6-(trifluoromethyl)-3H-indolium (Compound 10)

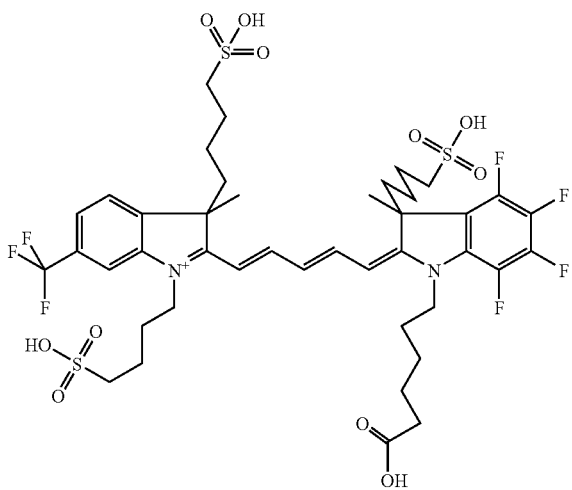

10.1 6-Trifluoromethyl-2,3-dimethyl-3-(4-sulfobutyl)-3H-indole

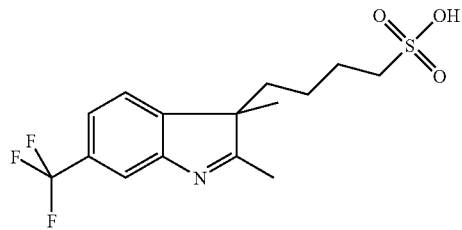

To 3-(trifluoromethyl)phenyl hydrazine (1 g) in acetic acid (30 ml) was added 5-methyl-6-oxoheptane-1-sulphonic acid (1.3 g) and the solution heated to reflux overnight. The volatiles were removed on a rotary evaporator to give the crude product, 1.3 g of which was purified by preparative HPLC. The relevant fractions were combined, concentrated on a rotary evaporator and freeze dried to give the desired product (55 mg). $M^+=349$ 10.2 6-Trifluoromethyl-2,3-dimethyl-1,3-bis(4-sulfobutyl)-3H-indolium

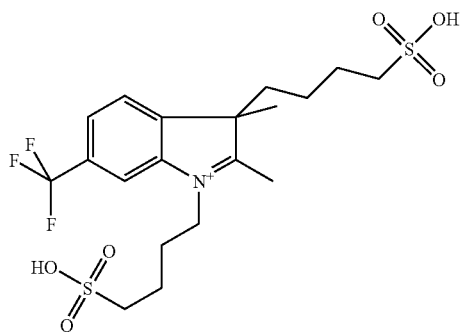

To 6-trifluoromethyl-2,3-dimethyl-3-(4-sulfobutyl)-3H-indole (27 mg) was added butane sultone (2 ml) and the solution heated to 140° C. for 3 days. On cooling, the product was extracted into water and purified by preparative HPLC. The relevant fractions were combined, concentrated on a rotary evaporator and freeze dried to give the desired product (14 mg). $M^+=486$ 10.3 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-3-methyl-1,3-bis(4-sulfobutyl)-6-(trifluoromethyl)-3H-indolium (Compound 10)

To 6-[(2E)-4,5,6,7-tetrafluoro-3-methyl-2-[(2E,4E)-4-(phenylimino)but-2-enylidene]-3-(4-sulfobutyl)-2,3-dihydro-1H-indol-1-yl]hexanoic acid (0.65 ml of ca. 5 mg/ml) was added 6-trifluoromethyl-2,3-dimethyl-1,3-bis(4-sulphonatobutyl)-3H-indolium (2.6 mg) and potassium acetate (6 mg). On agitation overnight, preparative HPLC was performed, the relevant fractions were combined, concentrated on a rotary evaporator and freeze dried to give the desired product (0.1 mg). $M^+=989$ 11. 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7,8,9-hexafluoro-1,1-dimethyl-3-(4-sulfobutyl)-1H-benzo[e]indolium (Compound 11)

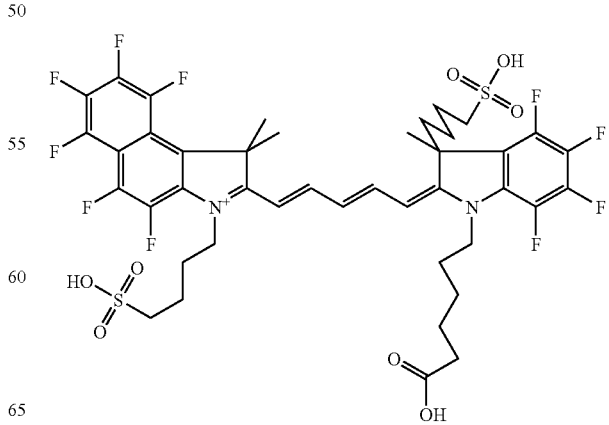

11.1 (1,2,3,4,6,7,9-Heptafluoro-5H-benzo[7]annulen-8-yl)hydrazine

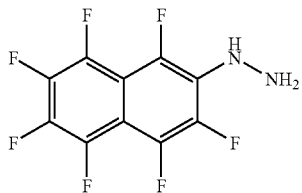

To octafluoronaphthalene (1.2 g) was added ethanol (20 ml) and hydrazine hydrate (0.6 ml). The mixture was heated to 50° C. overnight. On cooling the mixture was poured into water and the resulting precipitate filtered off. Air drying gave 1 g of buff material which was used without further purification.

$M^+=284$

11.2 3-Methylbutan-2-one(1,2,3,4,6,7,9-heptafluoro-5H-benzo[7]annulen-8-yl)hydrazone

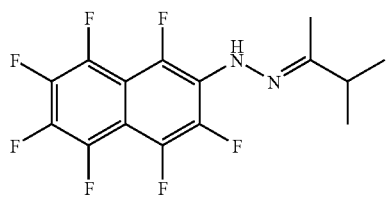

To (1,2,3,4,6,7,9-heptafluoro-5H-benzo[7]annulen-8-yl)hydrazine (1 g) was added ethanol (20 ml) and 3-methyl-2-butanone (0.38 g). The mixture was heated to reflux for 3 hours after which time the volatiles were removed on a rotary evaporator to give a solid (1 g) which was used in the next step. $M^+=352$

11.3 4,5,6,7,8,9-Hexafluoro-1,1,2-trimethyl-1H-benzo[e]indole

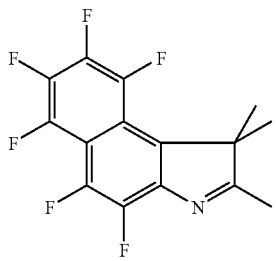

To 3-methylbutan-2-one(1,2,3,4,6,7,9-heptafluoro-5H-benzo[7]annulen-8-yl)hydrazone (44 mg) was added tetralin (2 ml) and the mixture heated to 200° C. overnight. On cooling to room temperature the mixture was subjected to preparative HPLC. The relevant fractions were combined, concentrated on a rotary evaporator and freeze dried to give the desired product (2 mg). $M^+=317$

11.4 4,5,6,7,8,9-Hexafluoro-1,1,2-trimethyl-3-(4-sulfobutyl)-1H-benzo[e]indolium

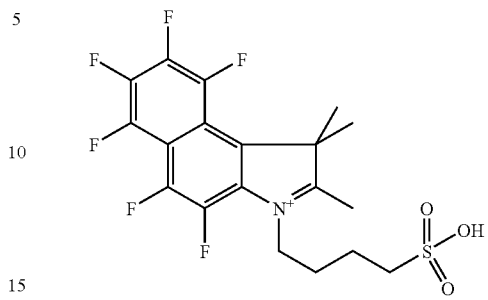

To 4,5,6,7,8,9-hexafluoro-1,1,2-trimethyl-1H-benzo[e]indole (2 mg) was added butane sultone (200 ul) and the mixture heated to 140° C. overnight. After preparative HPLC, the relevant fractions were combined, concentrated on a rotary evaporator and freeze dried to give the desired product (1 mg). $M^+=454$

11.5 2-{(1E,3E,5E)-5-[1-(5-Carboxypentyl)-4,5,6,7-tetrafluoro-3-methyl-3-(4-sulfobutyl)-1,3-dihydro-2H-indol-2-ylidene]penta-1,3-dienyl}-4,5,6,7,8,9-hexafluoro-1,1-dimethyl-3-(4-sulfobutyl)-1H-benzo[e]indolium (compound 11)

To 6-[(2E)-4,5,6,7-tetrafluoro-3-methyl-2-[(2E,4E)-4-(phenylimino)but-2-enylidene]-3-(4-sulfobutyl)-2,3-dihydro-1H-indol-1-yl]hexanoic acid (0.18 ml of ca. 5 mg/ml) was added 4,5,6,7,8,9-Hexafluoro-1,1,2-trimethyl-3-(4-sulfobutyl)-1H-benzo[e]indolium (0.7 mg) and potassium acetate (4 mg). On agitation overnight, preparative HPLC was performed, the relevant fractions were combined, concentrated on a rotary evaporator and freeze dried to give the desired product (0.1 mg). $M^+=957$

12. 2-{(1E,3E,5E)-5-[1-(5-Carboxypentyl)-4,6-difluoro-3,3-dimethyl-1,3-dihydro-2H-indol-2-ylidene]penta-1,3-dienyl}-6-fluoro-3-methyl-1,3-bis(4-sulfobutyl)-4-(trifluoromethyl)-3H-indolium (Compound 12)

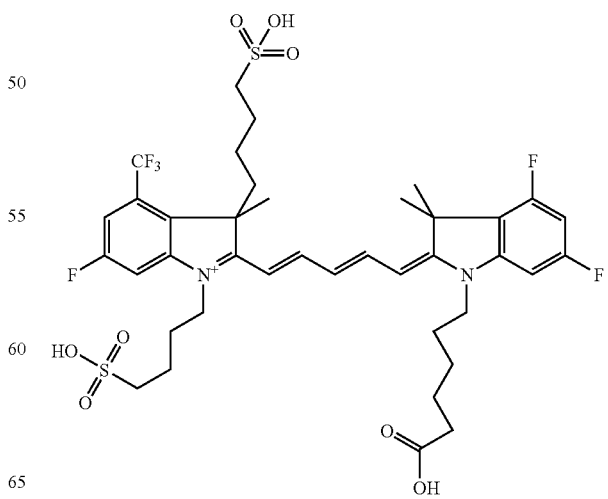

12.1 4-Trifluoromethyl-6-fluoro-2,3-dimethyl-3-(4-sulfobutyl)-3H-indole

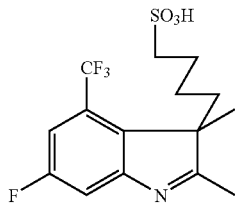

To 3-trifluoromethyl-5-fluorophenyl hydrazine (2 g) was added 5-methyl-6-oxoheptane-1-sulfonic acid (3 g) and acetic acid (60 ml) and the mixture heated to 140° C. for 5 hours. After this time the volatiles were removed on a rotary evaporator and the residue dissolved in water (10 ml), filtered and purified by preparative HPLC to give the desired product (790 mg). $MH^+=368$

12.2 4-Trifluoromethyl-6-fluoro-2,3-dimethyl-1,3-bis(4-sulfobutyl)-3H-indolium

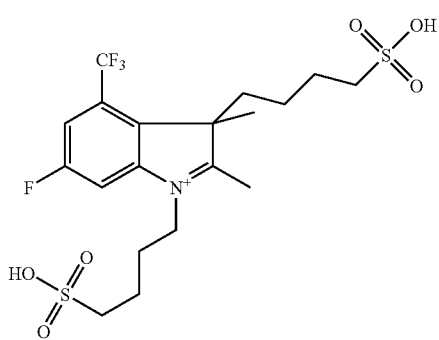

To 4-trifluoromethyl-6-fluoro-2,3-dimethyl-3-(4-sulfobutyl)-3H-indole (790 mg) was added butane sultone (10 ml) and the mixture heated at 140° C. overnight. The mixture was diluted with water (4 ml), filtered and purified by preparative HPLC to give the desired material (1 g). $MH^+=505$

12.3 2-{(1E,3E,5E)-5-[1-(5-Carboxypentyl)-4,6-difluoro-3,3-dimethyl-1,3-dihydro-2H-indol-2-ylidene]penta-1,3-dienyl}-6-fluoro-3-methyl-1,3-bis(4-sulfobutyl)-4-(trifluoromethyl)-3H-indolium (Compound 12)

To 6-[(2E)-4,6-difluoro-3,3-dimethyl-2-[(2E,4E)-4-(phenylimino)but-2-enylidene]-2,3-dihydro-1H-indol-1-yl]hexanoic acid (0.04 mmol) was added 4-trifluoromethyl-6-fluoro-2,3-dimethyl-1,3-bis(4-sulfobutyl)-3H-indolium (20 mg) and potassium acetate (35 mg). On agitation overnight, preparative HPLC was performed, the relevant fractions were combined, concentrated on a rotary evaporator and freeze dried to give the desired product (4.2 mg). $M^+=849$

13. 2-{(1E,3E,5E)-5-[1-(5-Carboxypentyl)-4,6-difluoro-3,3-dimethyl-1,3-dihydro-2H-indol-2-ylidene]penta-1,3-dienyl}-4,6-difluoro-3-methyl-1,3-bis(4-sulfobutyl)-3H-indolium (Compound 13)

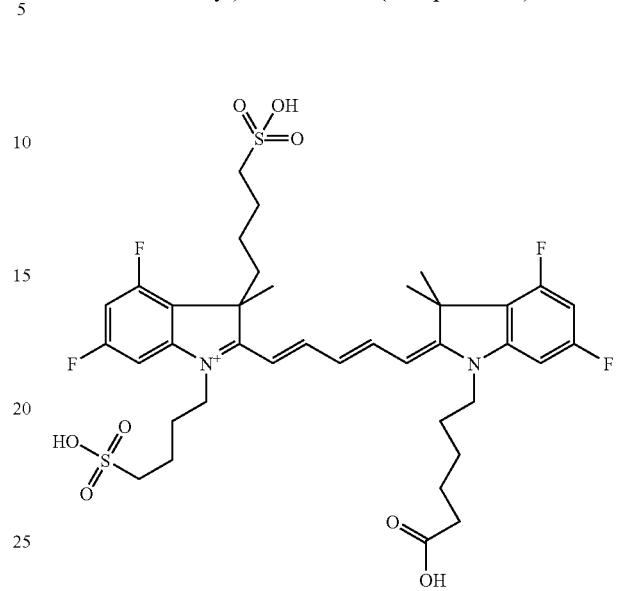

13.1 To 6-[(2E)-4,6-difluoro-3,3-dimethyl-2-[(2E,4E)-4-(phenylimino)but-2-enylidene]-2,3-dihydro-1H-indol-1-yl] hexanoic acid (0.04 mmol) was added 4,6-difluoro-2,3-dimethyl-1,3-bis(4-sulfobutyl)-3H-indolium (18.1 mg) and potassium acetate (35 mg). On agitation overnight, preparative HPLC was performed, the relevant fractions were combined, concentrated on a rotary evaporator and freeze dried to give the desired product (10.7 mg). $MH^+=800$

14. 2-{(1E,3E,5E)-5-[1-(5-Carboxypentyl)-4,6-difluoro-3,3-dimethyl-1,3-dihydro-2H-indol-2-ylidene]penta-1,3-dienyl}-3-methyl-5-sulfo-1,3-bis(4-sulfobutyl)-3H-indolium (Compound 14)

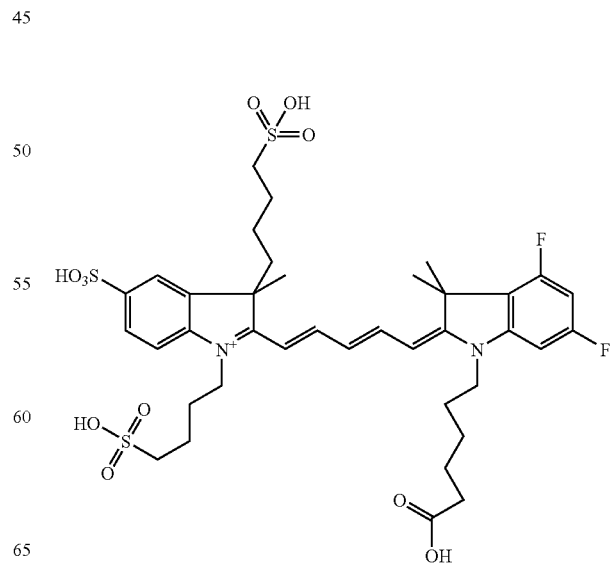

14.1 2,3-Dimethyl-3-(4-sulfobutyl)-5-sulfo-3H-indole

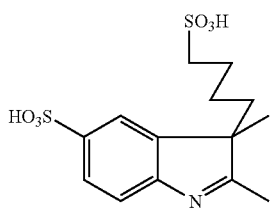

To hydrazinobenzene sulfonic acid (40 g) was added acetic acid (500 ml) and 5-methyl-6-oxoheptane-1-sulfonic acid (60 g). The mixture was heated to 150° C. for 6 hours and then cooled to room temperature. After filtration the volatiles were removed on a rotary evaporator to give a solid (110 g), 10 g of which was dissolved in methanol (1 L) and potassium hydroxide (38 g) in methanol (300 ml) added. The mixture was stirred for 1 hour and then stood overnight. The liquid layer was decanted off and the volatiles removed on a rotary evaporator to give the product as a pale yellow solid (80 g).

14.2 2,3-Dimethyl-1,3-bis(4-sulfobutyl)-5-sulfo-3H-indole

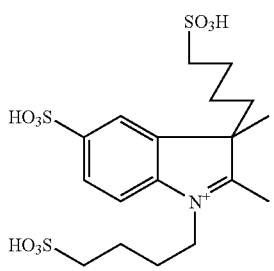

To 2,3-dimethyl-3-(4-sulfobutyl)-5-sulfo-3H-indole (10 g) was added butane sultone (30 g) and the mixture heated to 140° C. overnight. On cooling to room temperature, sulfolan (20 ml) was added and the mixture poured into diethyl ether (500 ml). The resultant precipitate was removed by filtration and dried to give the desired product (12 g).

14.3 2-{(1E,3E,5E)-5-[1-(5-Carboxypentyl)-4,6-difluoro-3,3-dimethyl-1,3-dihydro-2H-indol-2-ylidene]penta-1,3-dienyl}-3-methyl-5-sulfo-1,3-bis(4-sulfobutyl)-3H-indolium (Compound 14)

To 6-[(2E)-4,6-difluoro-3,3-dimethyl-2-[(2E,4E)-4-(phenylimino)but-2-enylidene]-2,3-dihydro-1H-indol-1-yl]hexanoic acid (0.04 mmol) was added 2,3-dimethyl-1,3-bis(4-sulfobutyl)-5-sulfo-3H-indole (20 mg) and potassium acetate (35 mg). On agitation overnight, preparative HPLC was performed, the relevant fractions were combined, concentrated on a rotary evaporator and freeze dried to give the desired product (8.9 mg). M$^+$=843

15. 2-{(1E,3E,5E)-5-[3-(5-Carboxypentyl)-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis-(4-sulfobutyl)-3H-indolium (Compound 15)

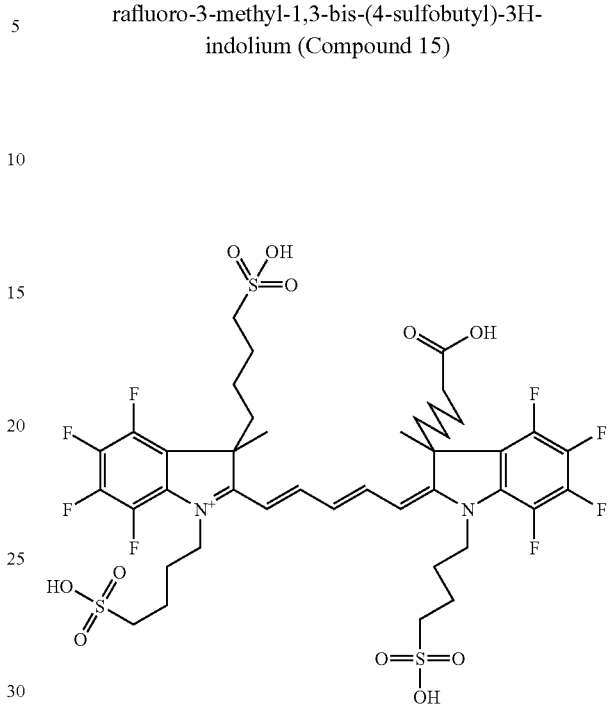

15.1 6-(4,5,6,7-Tetrafluoro-2,3-dimethyl-3H-indol-3-yl) hexanoic acid

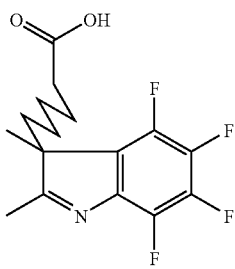

To tetrafluorophenyl hydrazine (2 g) was added 5-methyl-6-oxoheptane-1-carboxylic acid (3 g) and acetic acid (50 ml) and the mixture heated to 140° C. for 5 hours. On cooling the volatile components were removed on a rotary evaporator and the residue dissolved in water (10 ml), filtered and purified by preparative HPLC in 2 shots to give the desired product (600 mg). MH$^+$=332

15.2 3-(5-Carboxypentyl)-4,5,6,7-tetrafluoro-2,3-dimethyl-1-(4-sulfobutyl)-3H-indolium

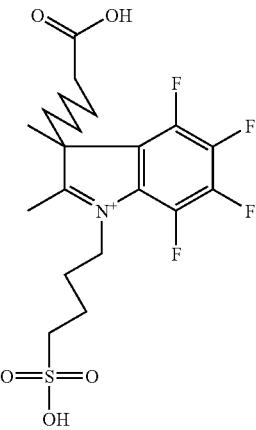

To 6-(4,5,6,7-tetrafluoro-2,3-dimethyl-3H-indol-3-yl)hexanoic acid (600 mg) was added butane sultone (4 ml) and the mixture heated to 140° C. overnight. On cooling the mixture was diluted with water (4 ml), filtered and purified by preparative HPLC to give the desired product (800 mg). MH$^+$=468

15.3 2-{(1E,3E,5E)-5-[3-(5-Carboxypentyl)-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis-(4-sulfobutyl)-3H-indolium (Compound 15)

To 3-(5-carboxypentyl)-4,5,6,7-tetrafluoro-2,3-dimethyl-1-(4-sulfobutyl)-3H-indolium (19 mg) was added malonaldehyde bisphenylimine (9.4 mg), acetic anhydride (0.5 ml) and acetic acid (0.25 ml). The mixture was heated at 120° C. for 1 hour and then allowed to cool to room temperature. 2,3-Dimethyl-4,5,6,7-tetrafluoro-1,3-bis(4-sulphonatobutyl)-3H-indolium (20 mg) and potassium acetate (35.7 mg) were added and the mixture stirred overnight. Preparative HPLC purification gave the desired product (4.5 mg). MH$^+$=994

15.4 2-{(1E,3E,5E)-5-[3-{6-[(2,5-Dioxopyrrolidin-1-yl)oxy]-6-oxohexyl}-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium

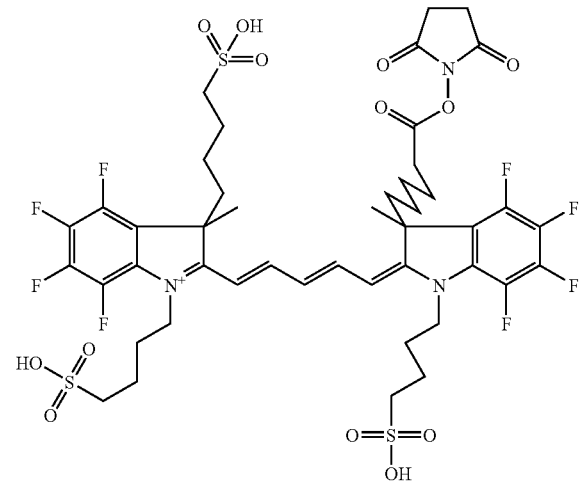

To 2-{(1E,3E,5E)-5-[3-(5-carboxypentyl)-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis-(4-sulfobutyl)-3H-indolium (2 mg) was added DMSO (1 ml), dipyrrolidino-(N-succinimidyloxy)carbenium hexafluorophosphate (4 mg) and diisopropyl ethylamine (40 ul). After agitation for 3 hours, the reaction mixture was subjected to preparative HPLC to give the desired product (0.7 mg). M$^+$=1091

16. 2-{(1E,3E,5E)-5-[3-(5-Carboxypentyl)-6-fluoro-3-methyl-1-(4-sulfobutyl)-4-(trifluoromethyl)-1,3-dihydro-2H-indol-2-ylidene]penta-1,3-dienyl}-4,5,6,7-tetrafluoro-3-methyl-1,3-bis(4-sulfobutyl)-3H-indolium (Compound 16)

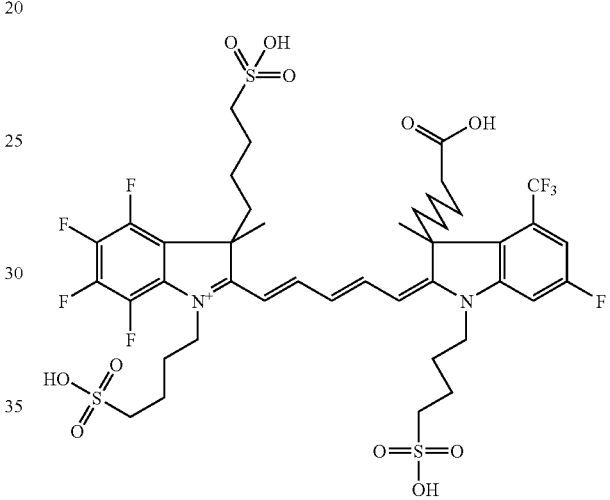

16.1 6-(4-Trifluoromethyl-6-fluoro-2,3-dimethyl-3H-indol-3-yl)hexanoic acid

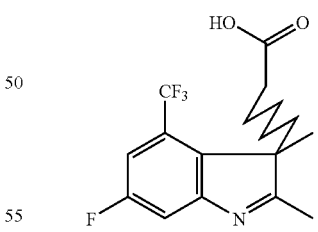

To 3-trifluoromethyl-5-fluorophenyl hydrazine (2 g) was added 5-methyl-6-oxoheptane-1-carboxylic acid (3 g) and acetic acid (50 ml) and the mixture heated to 140° C. for 5 hours. On cooling the volatile components were removed on a rotary evaporator and the residue dissolved in water (10 ml), filtered and purified by preparative HPLC in 2 shots to give the desired product (600 mg). MH$^+$=346

16.2 3-(5-Carboxypentyl)-4-trifluoromethyl-6-fluoro-2,3-dimethyl-1-(4-sulfobutyl)-3H-indolium

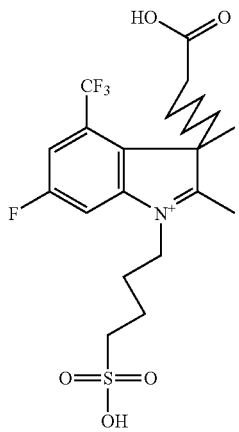

To 6-(4-trifluoromethyl-6-fluoro-2,3-dimethyl-3H-indol-3-yl)hexanoic acid (600 mg) was added butane sultone (4 ml) and the mixture heated to 140° C. overnight. On cooling the mixture was diluted with water (4 ml), filtered and purified by preparative HPLC to give the desired product (800 mg). MH$^+$=483

16.3 2-{(1E,3E,5E)-5-[3-(5-carboxypentyl)-6-fluoro-3-methyl-1-(4-sulfobutyl)-4-(trifluoromethyl)-1,3-dihydro-2H-indol-2-ylidene]penta-1,3-dienyl}-4,5,6,7-tetrafluoro-3-methyl-1,3-bis(4-sulfobutyl)-3H-indolium (Compound 16)

To 3-(5-carboxypentyl)-4-trifluoromethyl-6-fluoro-2,3-dimethyl-1-(4-sulfobutyl)-3H-indolium (50 mg) was added malonaldehyde bisphenylimine (24 mg), acetic anhydride (0.5 ml) and acetic acid (0.25 ml). The mixture was heated at 120° C. for 1 hour and then allowed to cool to room temperature. 2,3-Dimethyl-4,5,6,7-tetrafluoro-1,3-bis(4-sulphonato-butyl)-3H-indolium (51 mg) and potassium acetate (92 mg) were added and the mixture stirred overnight. Preparative HPLC purification gave the desired product (19.5 mg). MH$^+$=1008

16.4 2-{(1E,3E,5E)-5-[3-{6-[(2,5-Dioxopyrrolidin-1-yl)oxy]-6-oxohexyl}-6-fluoro-3-methyl-1-(4-sulfobutyl)-4-(trifluoromethyl)-1,3-dihydro-2H-indol-2-ylidene]penta-1,3-dienyl}-4,5,6,7-tetrafluoro-3-methyl-1,3-bis(4-sulfobutyl)-3H-indolium

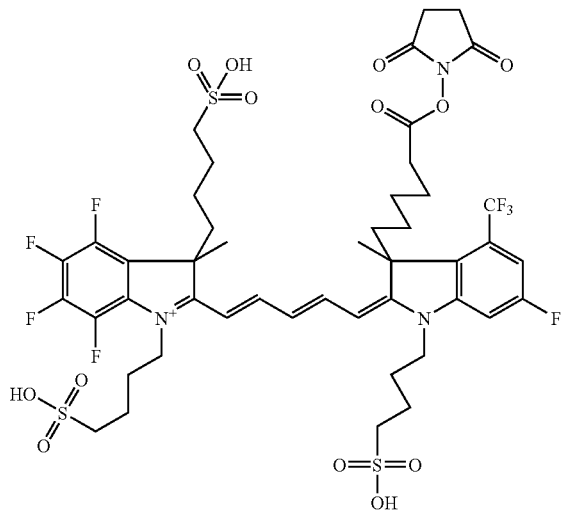

To 2-{(1E,3E,5E)-5-[3-(5-carboxypentyl)-4-trifluoromethyl-6-fluoro-3-methyl-1,3-dihydro-2H-indol-2-ylidene]penta-1,3-dienyl}-4,5,6,7-tetrafluoro-3-methyl-1,3-bis(4-sulfobutyl)-3H-indolium (5 mg) was added DMSO (1 ml), dipyrrolidino-(N-succinimidyloxy)carbenium hexafluorophosphate (10 mg) and diisopropyl ethylamine (40 ul). After agitation for 3 hours, the reaction mixture subjected to preparative HPLC to give the desired product (2.1 mg). M$^+$=1104

16.5 2-{(1E,3E,5E)-5-[3-(6-{[2-(2,5-Dioxo-2,5-dihydro-1H-pyrrol-1-yl)ethyl]amino}-6-oxohexyl)-4,5,6,7-tetrafluoro-3-methyl-1-(4-sulfobutyl)-1,3-dihydro-2H-indol-2-ylidene]penta-1,3-dienyl}-4,5,6,7-tetrafluoro-3-methyl-1,3-bis(4-sulfobutyl)-3H-indolium

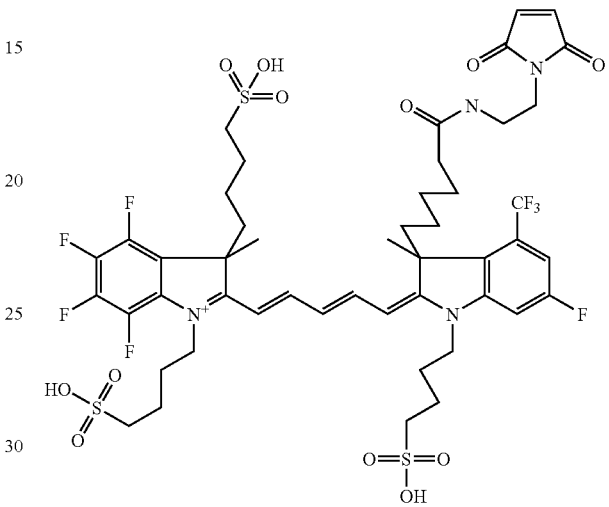

To N-[2-(N-t-butoxycarbonyl)aminoethyl]maleimide (4 mg) was stirred with 4M HCl in dioxin (100 ul) for 1 hour. After rotary evaporation, 2-{(1E,3E,5E)-5-[3-{6-[(2,5-dioxopyrrolidin-1-yl)oxy]-6-oxohexyl}-6-fluoro-3-methyl-1-(4-sulfobutyl)-4-(trifluoromethyl)-1,3-dihydro-2H-indol-2-ylidene]penta-1,3-dienyl}-4,5,6,7-tetrafluoro-3-methyl-1,3-bis(4-sulfobutyl)-3H-indolium (2 mg) in DMF (1 ml) and diisopropyl ethylamine (40 ul) were added and the mixture stirred for 2 hours. Preparative HPLC gave the desired product (2.1 mg). M$^+$=1129

17. 2-{(1E,3E,5E)-5-[3-(5-Carboxypentyl)-4-trifluoromethyl-6-fluoro-3-methyl-1,3-dihydro-2H-indol-2-ylidene]penta-1,3-dienyl}-3-(5-carboxypentyl)-4-trifluoromethyl-6-fluoro-3-methyl-3H-indolium (Compound 17)

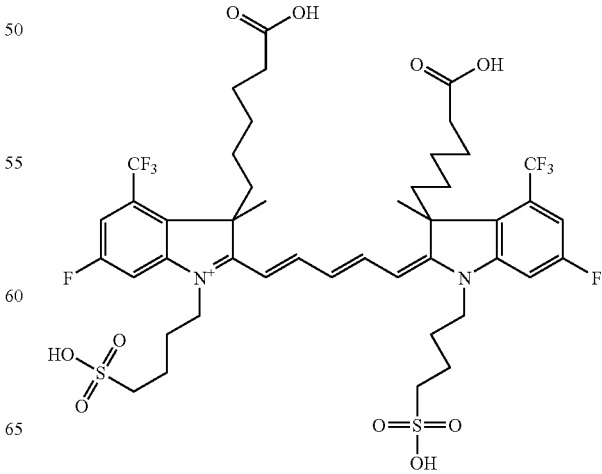

17.1  2-{(1E,3E,5E)-5-[3-(5-Carboxypentyl)-4-trifluoromethyl-6-fluoro-3-methyl-1,3-dihydro-2H-indol-2-ylidene]penta-1,3-dienyl}-3-(5-carboxypentyl)-4-trifluoromethyl-6-fluoro-3-methyl-3H-indolium (compound 17)

The experiment described in 16.3 also gave this material isolated via preparative HPLC (8.5 mg). $MH^+=1000$

18. 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3,5-trienyl}-3-methyl-1,3-bis(4-sulfobutyl)-4,6-bis(trifluoromethyl)-3H-indolium (Compound 18)

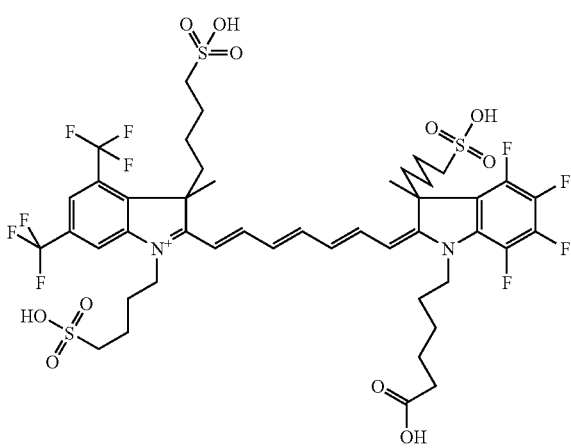

18.1  4,6-Bis(trifluoromethyl)-2,3-dimethyl-3-(4-sulfobutyl)-3H-indole

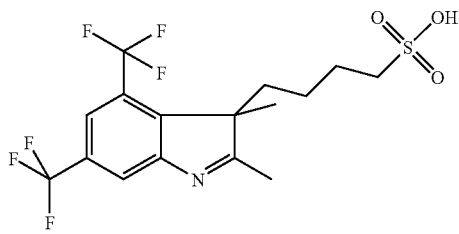

To 3,5-bis(trifluoromethyl)phenyl hydrazine (1 g) in acetic acid (30 ml) was added 5-methyl-6-oxoheptane-1-sulphonic acid (1.5 g) and the solution heated to reflux for 3 days. The volatiles were removed on a rotary evaporator to give the crude product, 0.8 g of which was purified by preparative HPLC. The relevant fractions were combined, concentrated on a rotary evaporator and freeze dried to give the desired product (60 mg). $M^+=417$ 18.2  4,6-Bis(trifluoromethyl)-2,3-dimethyl-1,3-bis(4-sulfobutyl)-3H-indolium

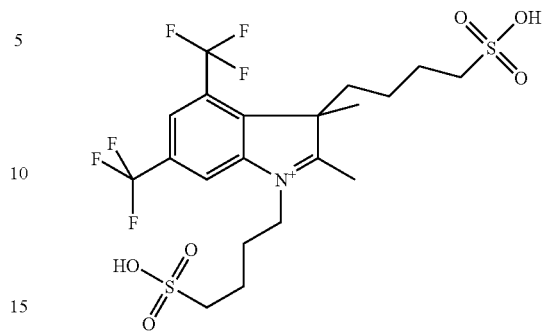

To 4,6-bis(trifluoromethyl)-2,3-dimethyl-3-(4-sulfobutyl)-3H-indole (27 mg) was added butane sultone (2 ml) and the solution heated to 140° C. for 3 days. On cooling, the product was extracted into water and purified by preparative HPLC. The relevant fractions were combined, concentrated on a rotary evaporator and freeze dried to give the desired product (7 mg). $M^+=554$ 18.3  6-[(2E)-4,5,6,7-tetrafluoro-3-methyl-2-[(2E,4E,6E)-6-(Phenylimino)hexa-2,4-dienylidene]-3-(4-sulfobutyl)-2,3-dihydro-1H-indol-1-yl]hexanoic acid

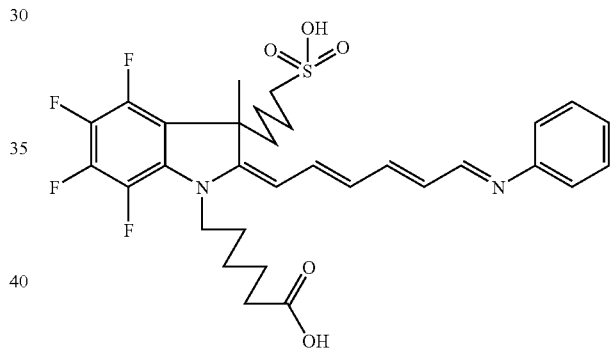

To 1-(5-carboxypentyl)-4,5,6,7-tetrafluoro-3-methyl-3-(4-sulfobutyl)-3H-indolium (24 mg) was added N-[5-(phenylamino)-2,4-pentadienylidene monohydrochloride (13 mg), acetic anhydride (4 ml) and acetic acid (2 ml). This mixture was heated to 120° C. for 1 hour 45 minutes after which time it was cooled to room temperature. This crude reaction mixture (ca. 5 mg/ml product) was used without purification as further described.

18.4  2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3,5-trienyl}-3-methyl-1,3-bis(4-sulfobutyl)-4,6-bis(trifluoromethyl)-3H-indolium (Compound 18)

To 6-[(2E)-4,5,6,7-tetrafluoro-3-methyl-2-[(2E,4E,6E)-6-(phenylimino)hexa-2,4-dienylidene]-3-(4-sulfobutyl)-2,3-dihydro-1H-indol-1-yl]hexanoic acid (1.6 ml of ca. 5 mg/ml) was added 4,6-bis(trifluoromethyl)-2,3-dimethyl-1,3-bis(4-sulfobutyl)-3H-indolium (7 mg) and potassium acetate (10 mg). On agitation overnight, preparative HPLC was performed, the relevant fractions were combined, concentrated on a rotary evaporator and freeze dried to give the desired product (1 mg). $M^+=1083$

19. 2-{(1E,3E,5E,7E)-7-[1-(5-Carboxypentyl)-4,5,6, 7-tetrafluoro-3-methyl-3-(4-sulfobutyl)-1,3-dihydro-2H-indol-2-ylidene]hepta-1,3,5-trienyl}-3-methyl-1, 3-bis(4-sulfobutyl)-5-trifluoromethyl-3H-indolium (Compound 19)

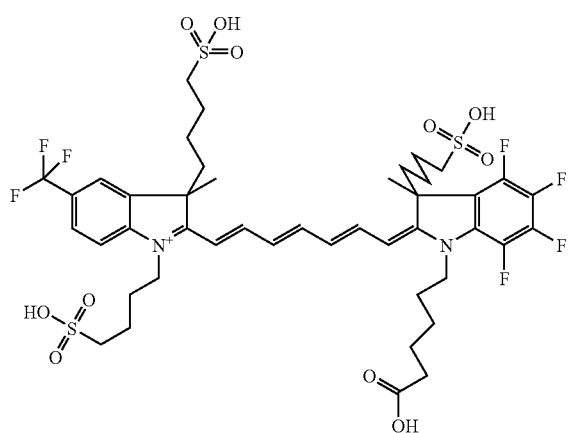

19.1 5-Trifluoromethyl-2,3-dimethyl-3-(4-sulfobutyl)-3H-indole

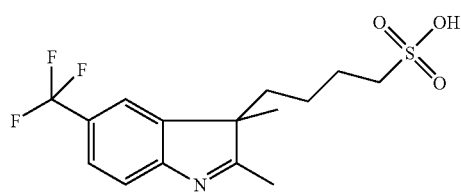

To 4-(trifluoromethyl)phenyl hydrazine (2.18 g) in acetic acid (30 ml) was added 5-methyl-6-oxoheptane-1-sulphonic acid (4 g) and the solution heated to reflux overnight. The volatiles were removed on a rotary evaporator to give the crude product, 0.44 g of which was purified by preparative HPLC. The relevant fractions were combined, concentrated on a rotary evaporator and freeze dried to give the desired product (180 mg). $M^+=349$

19.2 5-Trifluoromethyl-2,3-dimethyl-1,3-bis(4-sulfobutyl)-3H-indolium

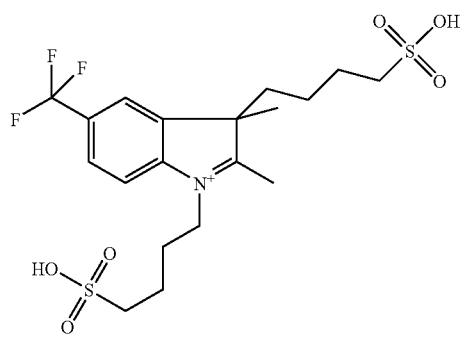

To 5-trifluoromethyl-2,3-dimethyl-3-(4-sulfobutyl)-3H-indole (50 mg) was added butane sultone (2 ml) and the solution heated to 140° C. for 3 days. On cooling, the product was extracted into water and purified by preparative HPLC. The relevant fractions were combined, concentrated on a rotary evaporator and freeze dried to give the desired product (29 mg). $M^+=486$

19.3 2-{(1E,3E,5E,7E)-7-[1-(5-Carboxypentyl)-4,5,6,7-tetrafluoro-3-methyl-3-(4-sulfobutyl)-1,3-dihydro-2H-indol-2-ylidene]hepta-1,3,5-trienyl}-3-methyl-1,3-bis(4-sulfobutyl)-5-trifluoromethyl-3H-indolium (Compound 19)

To 6-[(2E)-4,5,6,7-tetrafluoro-3-methyl-2-[(2E,4E,6E)-6-(phenylimino)hexa-2,4-dienylidene]-3-(4-sulfobutyl)-2,3-dihydro-1H-indol-1-yl]hexanoic acid (1.6 ml of ca. 5 mg/ml) was added 5-Trifluoromethyl-2,3-dimethyl-1,3-bis(4-sulfobutyl)-3H-indolium (6 mg) and potassium acetate (10 mg). On agitation overnight, preparative HPLC was performed, the relevant fractions were combined, concentrated on a rotary evaporator and freeze dried to give the desired product (2.8 mg). $M^+=1015$

20. 2-{(1E,3E)-3-[1-(5-Carboxypentyl)-4,5,6,7-tetrafluoro-3-methyl-3-(4-sulfobutyl)-1,3-dihydro-2H-indol-2-ylidene]prop-1-enyl}-4,5,6,7-tetrafluoro-3-methyl-1,3-bis(4-sulfobutyl)-3H-indolium (Compound 20)

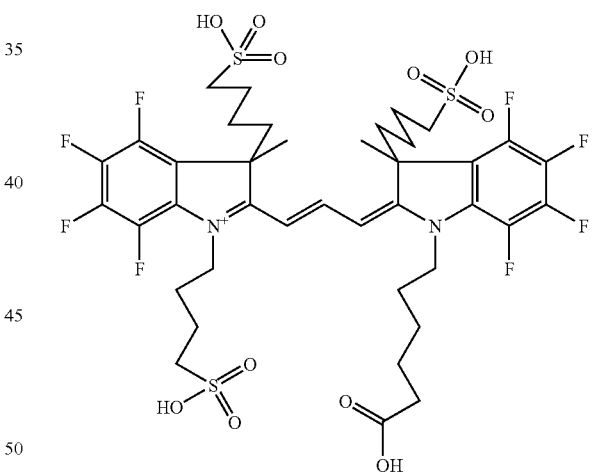

20.1 To 1-(5-carboxypentyl)-2,3-dimethyl-3-(4-sulfobutyl)-4,5,6,7-tetrafluoro-3H-indolium (2 mg) was added 2,3-dimethyl-4,5,6,7-tetrafluoro-1,3-bis(4-sulphonatobutyl)-3H-indolium (2.3 mg), ethanol (0.5 ml), triethyl orthoformate (100 ul) and pyridine (20 ul). The mixture was heated on an oil bath at 120° C. for 4 hours, after which time it was left at room temperature overnight. The mixture was diluted with water and preparative HPLC was performed. The relevant fractions were combined, concentrated on a rotary evaporator and freeze dried to give the desired product (0.1 mg). $M^+=967$. A further compound was also isolated as described in 21.

21. 1-(5-Carboxypentyl)-2-{(1E,3E)-3-[1-(5-carboxypentyl)-4,5,6,7-tetrafluoro-3-methyl-3-(4-sulfobutyl)-1,3-dihydro-2H-indol-2-ylidene]prop-1-enyl}-4,5,6,7-tetrafluoro-3-methyl-3-(4-sulfobutyl)-3H-indolium (Compound 21)

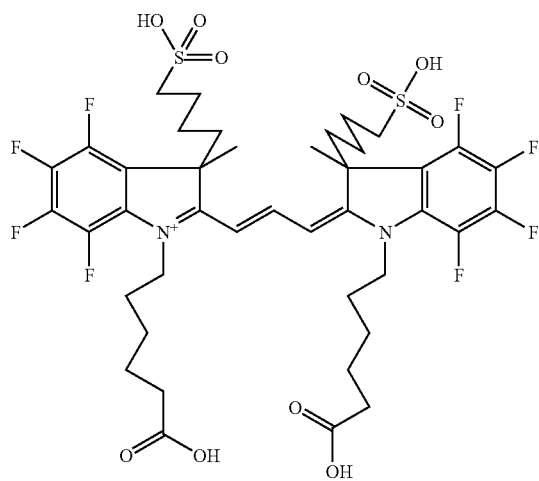

21.1 The experiment described in 20.1 also gave this material isolated via preparative HPLC (0.1 mg). M+=945

22. 3-(5-Carboxypentyl)-3-methyl-2-{(1E,3E,5E)-5-[3-methyl-1,3-bis(4-sulfobutyl)-1,3-dihydro-2H-indol-2-ylidene]penta-1,3-dienyl}-5-sulfo-1-(4-sulfobutyl)-3H-indolium (Compound 22)

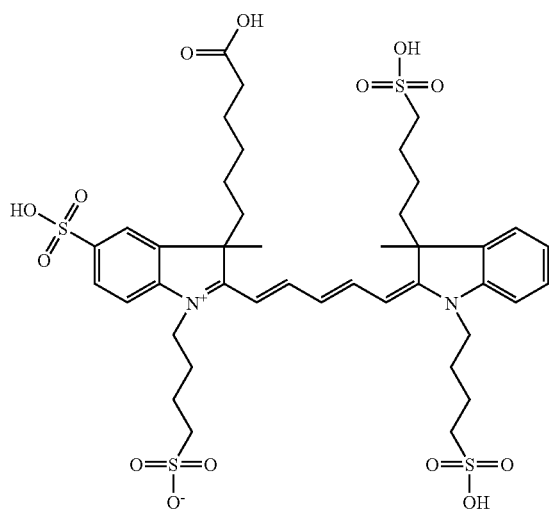

22.1  2,3-Dimethyl-1,3-bis(4-sulphonatobutyl)-3H-indolium, disodium salt

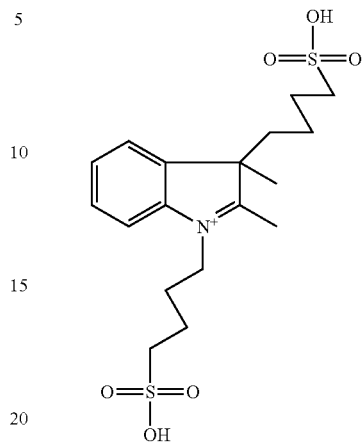

Sulphonated indole (~5 g, 18 mmol) and butane sultone (12.2 g, 90 mmol, 5 eq.) were stirred at 140° for 4 hours. The reaction mixture was allowed to cool and then poured into stirring ethyl acetate. The material did not precipitate, but remained as an oil from which the ethyl acetate was decanted. Yield: ~10 g. M+=418.

22.2  3-(5-Carboxypentyl)-3-methyl-2-{(1E,3E,5E)-5-[3-methyl-1,3-bis(4-sulfobutyl)-1,3-dihydro-2H-indol-2-ylidene]penta-1,3-dienyl}-5-sulfo-1-(4-sulfobutyl)-3H-indolium (Compound 22)

2,3-Dimethyl-3-(5-carboxypentyl)-5-sulfo-1-(3-sulfobutyl)indolium, disodium salt (3.4 g, 6.84 mmol) was dissolved in acetic acid (25 ml) containing triethylamine (2.5 ml). Malonaldehyde bisphenylimine HCl (4.15 g, 16 mmol) was added and the mixture heated at 140° C. with stirring overnight. The reaction mixture was rotary evaporated to yield a red oil which was dissolved in water (50 ml) and acetonitrile (30 ml). This was filtered and purified to yield 1 g of dye intermediate. The dye intermediate was dissolved in acetic acid:acetic acid (1:1, 50 ml) together with 1 equivalent of 2,3-dimethyl-1,3-bis(4-sulphonatobutyl)-3H-indolium (disodium salt) and potassium acetate (2 g). The reaction stirred at 120° for 4 hours, then rotary evaporated to dryness and purified by reverse phase HPLC. Yield: 85 mg. M+=929.

23. Photostability Studies

Photostability studies were performed as detailed below. All fluorophores were dissolved in water at equimolar concentrations. Each solution was divided into further vials. Some vials were maintained in a dark environment as control samples during the course of the experiments. The others were exposed to a strong light source.

A Wallac light box (1295-013) was employed as the strong light source. Samples were maintained at 22 cm above the light source, with continuous exposure to light. The UV/visible spectrum of each sample was measured once every twenty four hours. The same cuvettes and spectrophotometer were used for each measurement point. For the control samples maintained in the dark, the UV/visible absorption spectra were measured at both the start and at the end of the experiment. Seven sets of experiments were performed.

23.1 The photostabilities of Cy5F (Compound 1) and Compound 4 were studied in comparison with a non-fluorinated analogue, Cy5.

23.2 The photostability of Cy7F (Compound 2), Compound 18 and Compound 19 was compared with a non-fluorinated analogue, Cy7.

23.3 The photostabilities of Compound 3 and Compound 22 were compared with Alexa 647 (Invitrogen).

23.4 The photostabilities of Compounds 5, 7, 9, 11 and 13 were compared with Alexa 647 (Invitrogen) and Cy5.

23.5 The photostabilities of Compounds 6, 8, 10, 12 and 14 were compared with Cy5.

23.6 The photostabilities of Compounds 15, 16 and 17 were compared with Alexa 647 (Invitrogen) and Cy5.

23.7 The photostabilities of Compound 20 and Compound 21 were compared with Cy3.

Figure 4:
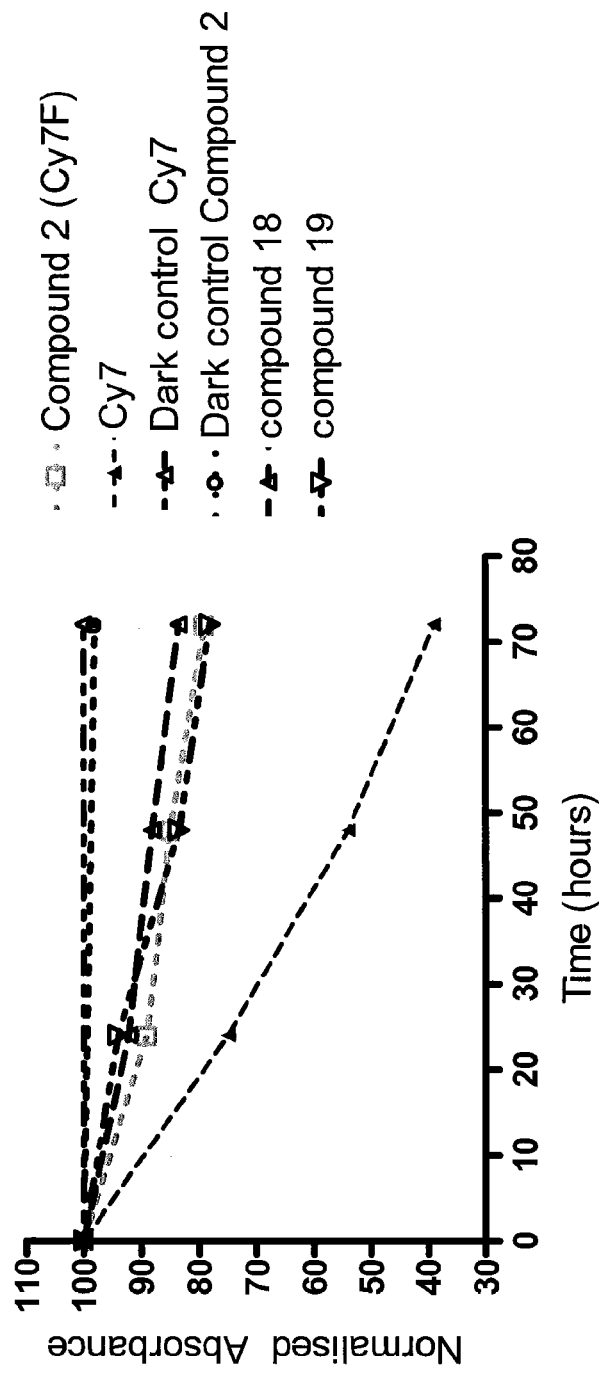
FIG. 4 is a plot showing photostability data for Cy7F (Compound 2), Compound 18 and Compound 19 compared with the non-fluorinated analogue (Cy7)
Figure 5:
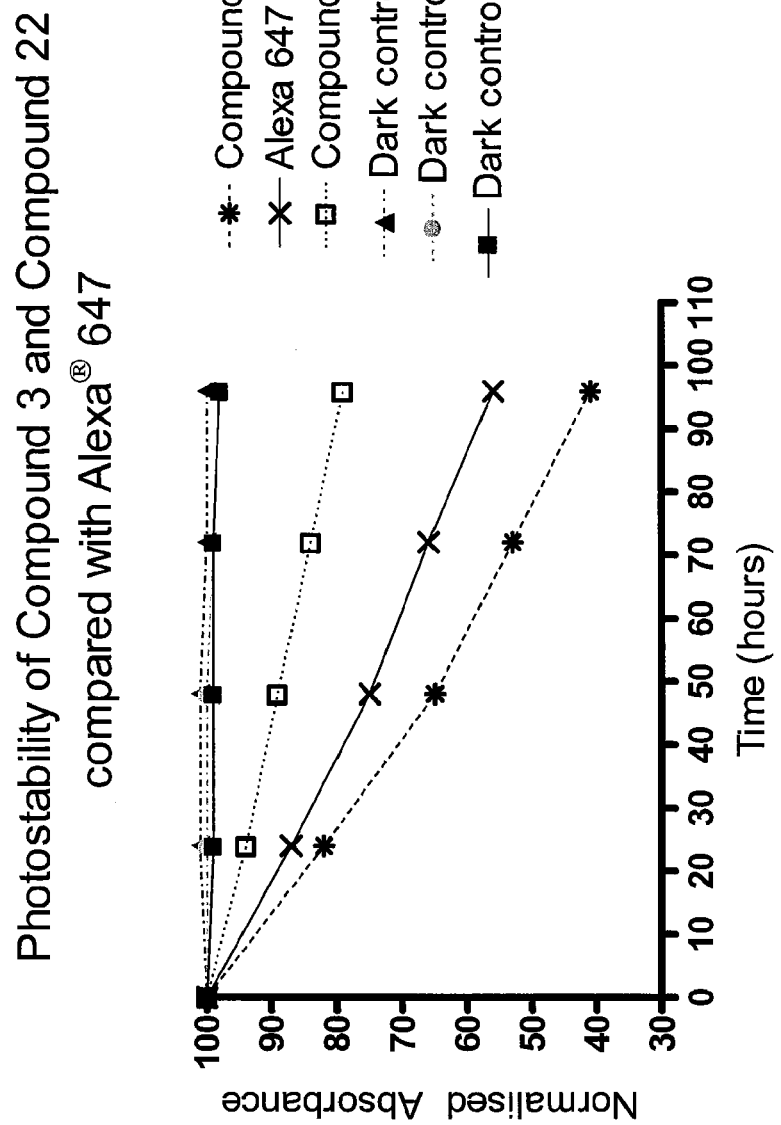
FIG. 5 is a plot showing photostability data for Compound 3 and Compound 22 compared with Alexa® 647 (Invitrogen)
Figure 6:
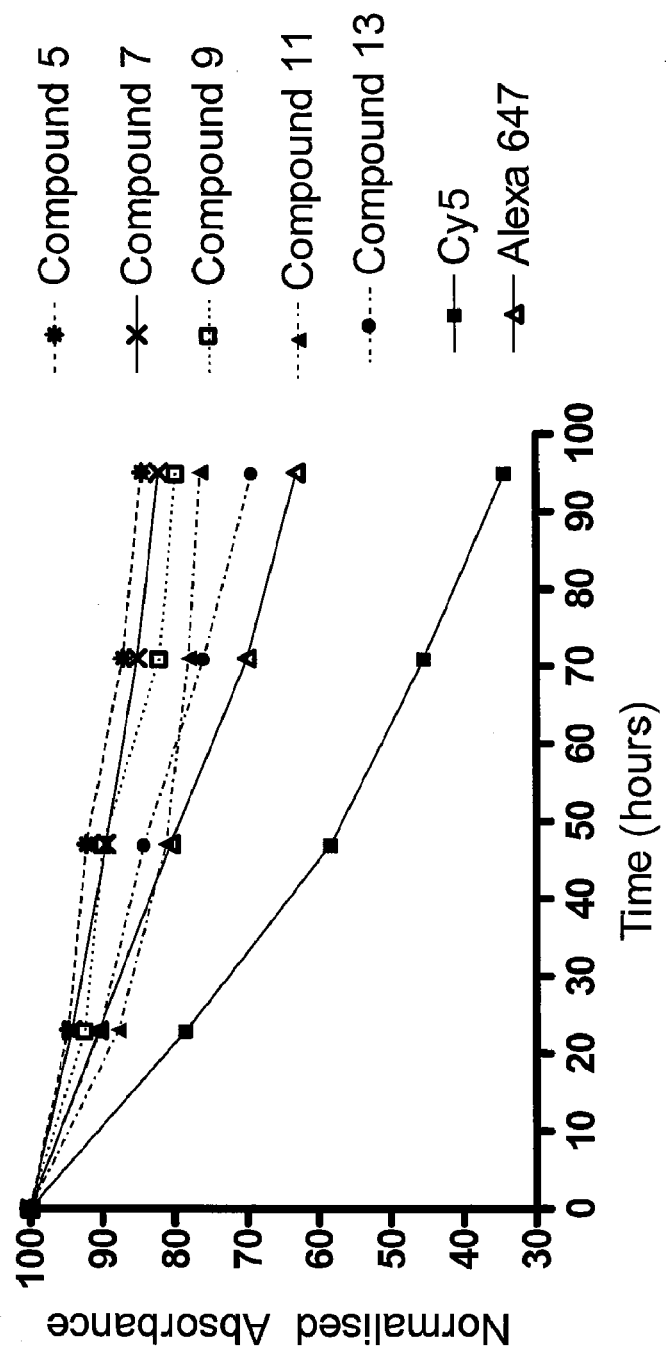
FIG. 6 is a plot showing photostability data for Compounds 5, 7, 9, 11 and 13 compared with Alexa® 647 (Invitrogen) and Cy5.
Figure 7:
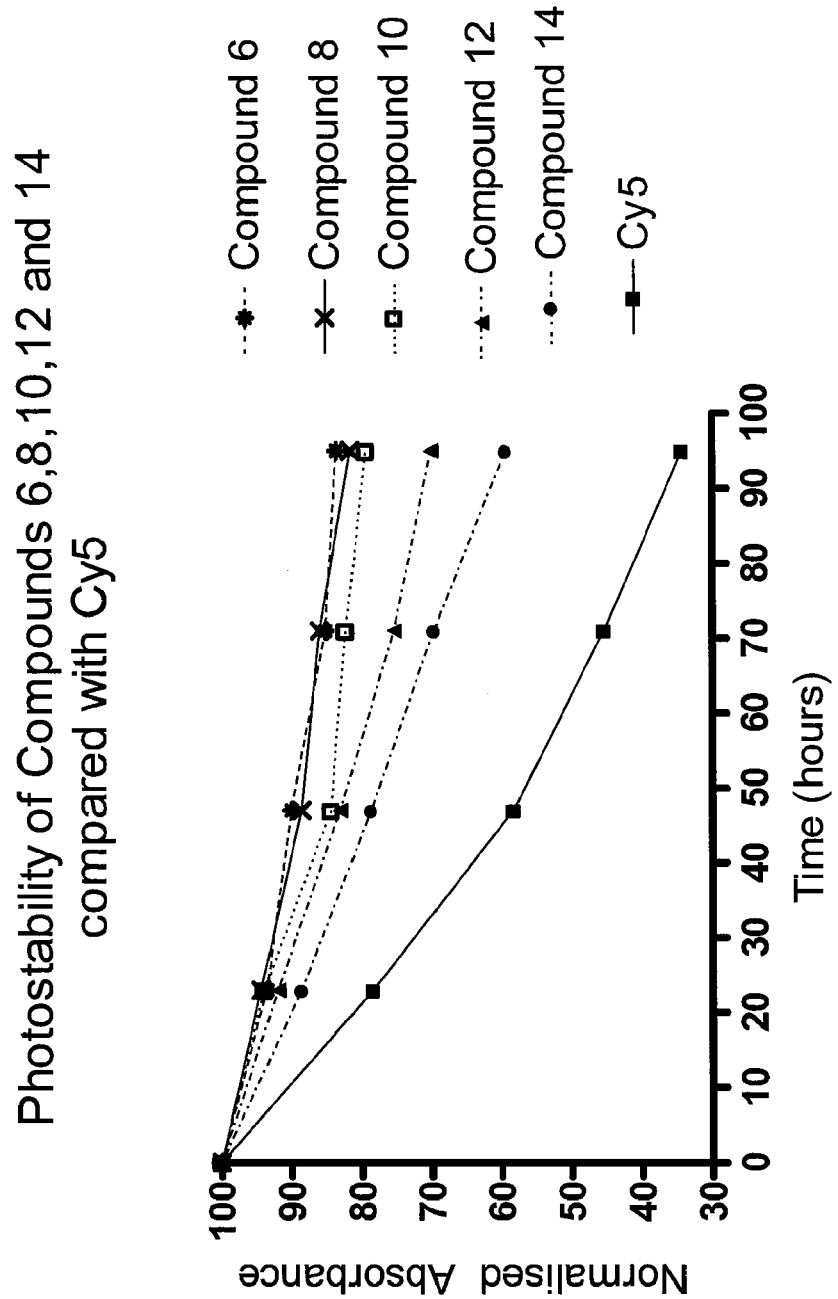
FIG. 7 is a plot showing photostability data for Compounds 6, 8, 10, 12 and 14 compared with Cy5.
Figure 8:
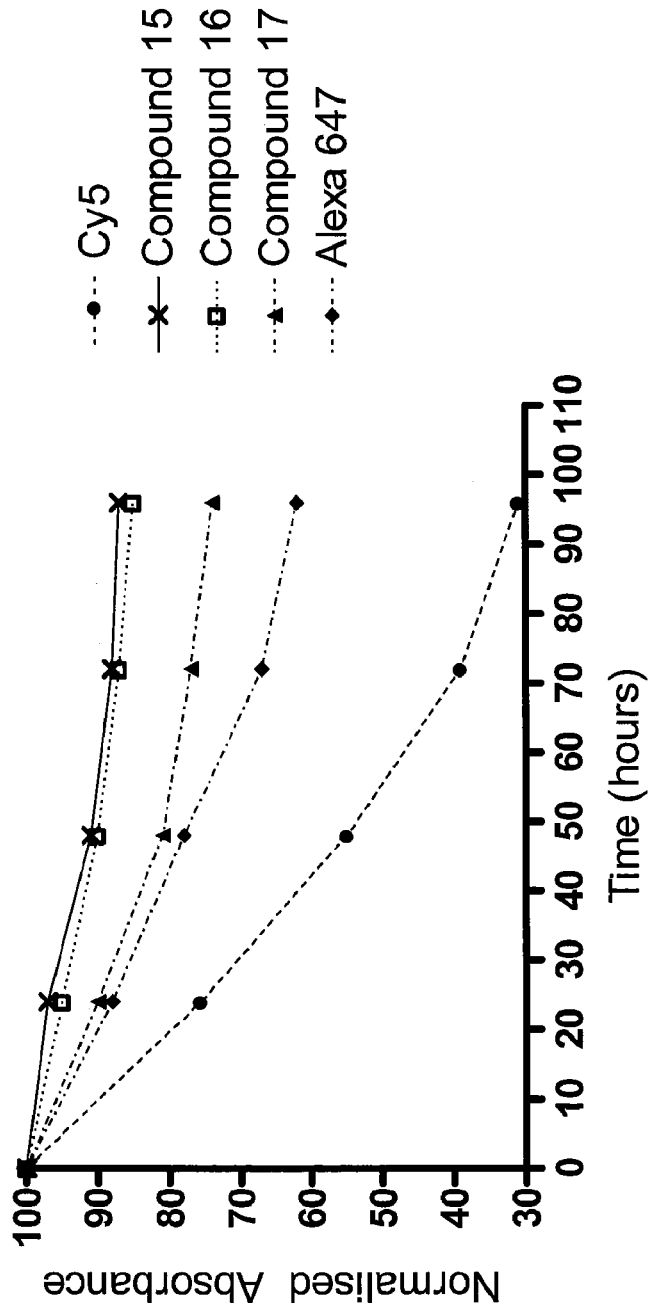
FIG. 8 is a plot showing photostability data for Compounds 15, 16 and 17 compared with Alexa® 647 (Invitrogen) and Cy5.
Figure 9:
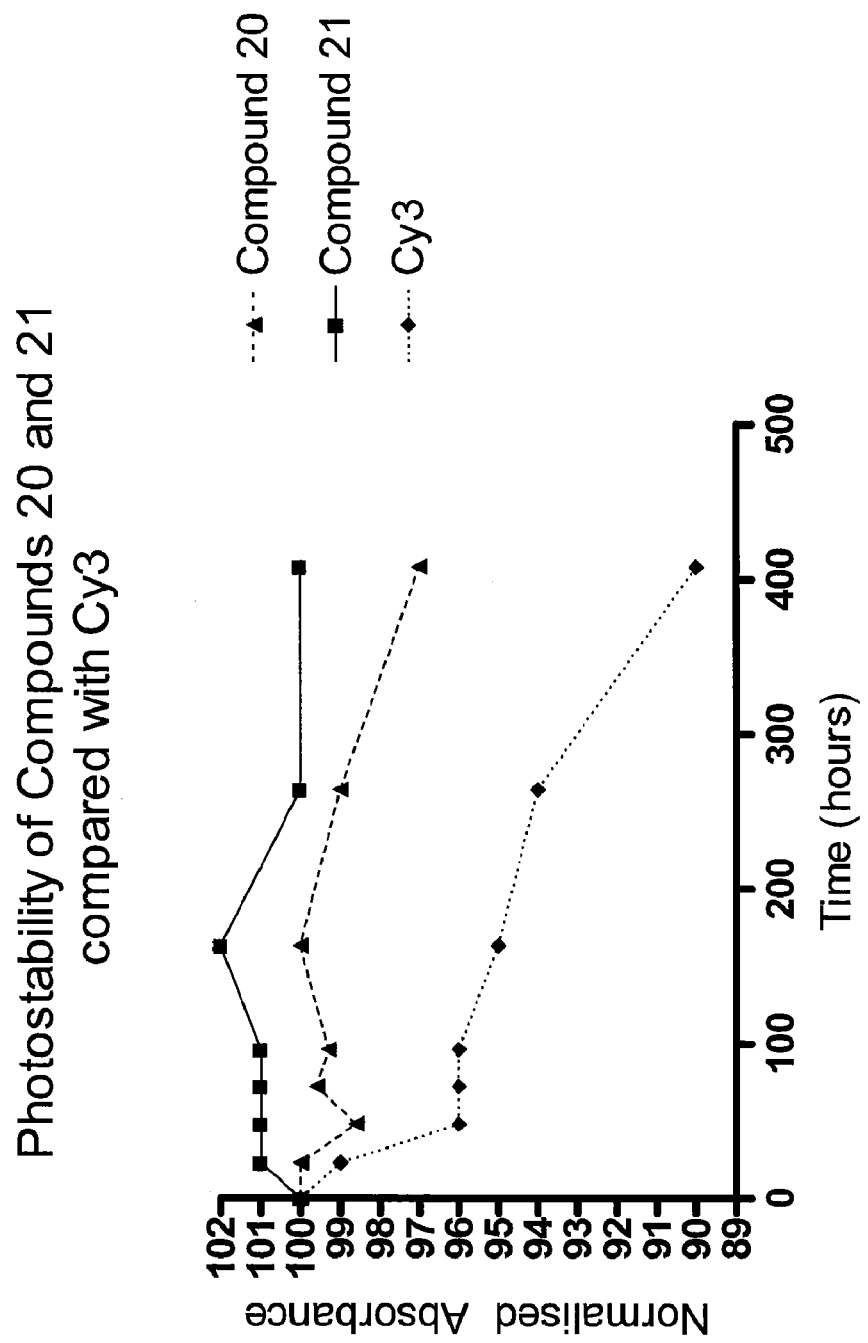
FIG. 9 is a plot showing photostability data for Compound 20 and Compound 21 compared with Cy3.
Figure 10:
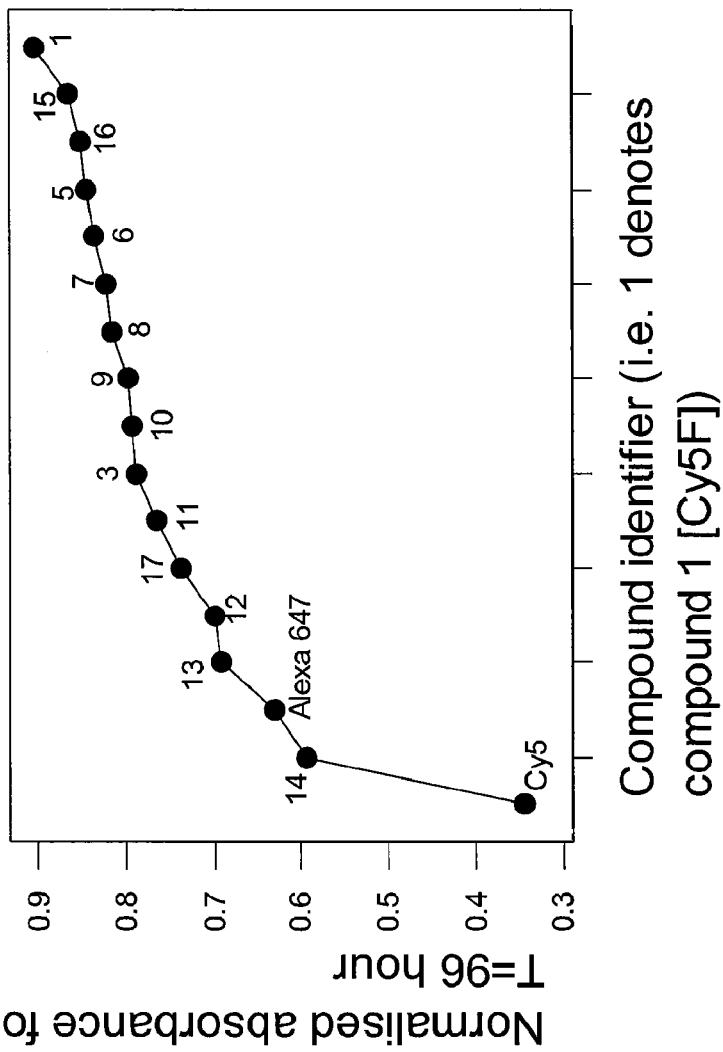
FIG. 10 is a plot showing Compounds 1, 3 and 5-17 sorted in order of photostability for the T=96 hour data point.

The data for each experiment was normalised and plotted as shown in FIGS. 3, 4, 5, 6, 7, 8 and 9. The results demonstrate that the fluorinated dyes generally demonstrate greater resistance to photobleaching when compared with the non-fluorinated dye analogues. Control reactions that were not exposed to light over the same period, showed no reduction in absorption.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A compound selected from:

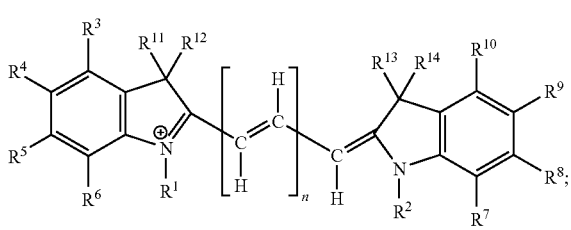

(II)

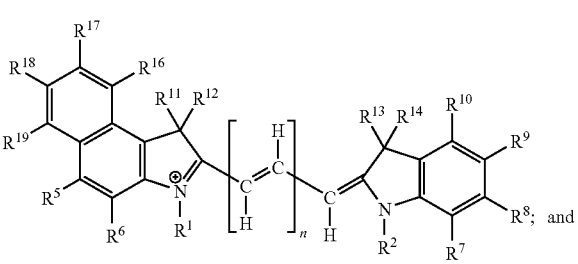

(III)

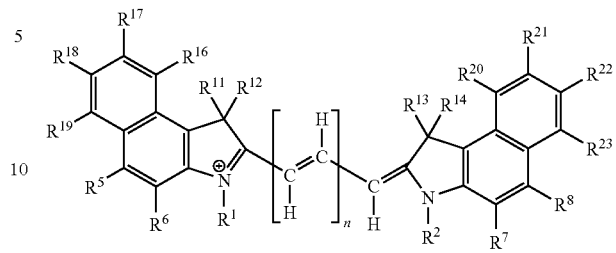

(IV)

wherein:
at least one of groups $R^1$, $R^2$, $R^{11}$, $R^{12}$, $R^{13}$ and $R^{14}$ is -L-M or -L-P, where L is a linking group having the formula:

—(CHR')$_p$-Q-(CHR')$_r$— where Q is selected from: —CHR'—, —NR'—, —O—, —S—, —C(O)—NR'— and —C(O)—O—,
where R' is hydrogen or $C_1$-$C_4$ alkyl; p is 0-5 and r is 1-5;
M is a target bonding group; and
P is a conjugated component;
when any of groups $R^1$, $R^2$, $R^{11}$, $R^{12}$, $R^{13}$ and $R^{14}$ is not -L-M or -L-P, said remaining groups $R^1$, $R^2$, $R^{11}$, $R^{12}$, $R^{13}$ and $R^{14}$ are selected independently from $C_1$-$C_6$ alkyl, and —(CH$_2$)$_k$—SO$_3$H, where k is an integer from 1 to 10;
at least one of groups $R^3$, $R^4$, $R^5$ and $R^6$ and/or groups $R^7$, $R^8$, $R^9$ and $R^{10}$ are perfluoro $C_1$-$C_4$ alkyl and any remaining groups $R^3$, $R^4$, $R^5$, $R^6$, $R^7$, $R^8$, $R^9$ and $R^{10}$ are selected from H or F;
groups $R^{16}$, $R^{17}$, $R^{18}$, $R^{19}$, $R^{20}$, $R^{21}$, $R^{22}$ and $R^{23}$ when present are selected independently from hydrogen, —SO$_2$—CF$_3$ and —(CF$_2$)$_m$—F, where m is 0 or an integer from 1 to 4; and
n is an integer from 1 to 3.

2. The compound of claim 1, wherein:
at least one of groups $R^1$ and $R^2$ is -L-M or -L-P and any remaining group $R^1$ or $R^2$ is selected from $C_1$-$C_6$ alkyl and (CH$_2$)$_k$—SO$_3$H;
at least one of groups $R^{11}$, $R^{12}$, $R^{13}$ and $R^{14}$ is —(CH$_2$)$_k$—SO$_3$H and any remaining groups $R^{11}$, $R^{12}$, $R^{13}$ and $R^{14}$ are $C_1$-$C_6$ alkyl.

3. The compound of claim 1, wherein remaining group $R^1$ or $R^2$ is —(CH$_2$)$_k$—SO$_3$H.

4. The compound of claim 1, wherein at least two of $R^{11}$, $R^{12}$, $R^{13}$ and $R^{14}$ are —(CH$_2$)$_k$—SO$_3$H.

5. The compound of claim 4, wherein one of groups $R^{11}$ and $R^{12}$ and one of groups $R^{13}$ and $R^{14}$ is —(CH$_2$)$_k$—SO$_3$H; and remaining groups $R^{11}$, $R^{12}$, $R^{13}$ or $R^{14}$ are $C_1$-$C_6$ alkyl.

6. The compound of claim 1, wherein:
at least one of groups $R^{11}$, $R^{12}$, $R^{13}$ and $R^{14}$ is -L-M or -L-P and any remaining groups $R^{11}$, $R^{12}$, $R^{13}$ and $R^{14}$ are selected from $C_1$-$C_6$ alkyl, and —(CH$_2$)$_k$—SO$_3$H;
at least one of groups $R^1$ and $R^2$ is —(CH$_2$)$_k$—SO$_3$H and any remaining group $R^1$ or $R^2$ is $C_1$-$C_6$ alkyl.

7. The compound of claim 6, wherein $R^1$ and $R^2$ are —(CH$_2$)$_k$—SO$_3$H.

8. The compound of claim 1, wherein —(CH$_2$)$_k$—SO$_3$H is selected from —(CH$_2$)$_3$—SO$_3$H and —(CH$_2$)$_4$—SO$_3$H.

9. The compound of claim 1, wherein Q is selected from: —CHR'— and —C(O)—NH—.

10. The compound of claim 1, wherein Q is —CHR'— and R' is hydrogen.

11. The compound of claim 1, wherein -L-M or -L-P comprise a carboxypentyl group.

12. The compound of claim 1, wherein not more than two of the $R^3$, $R^4$, $R^5$ and $R^6$ positions and/or the $R^7$, $R^8$, $R^9$ and $R^{10}$ positions are substituted by perfluoro $C_1$-$C_4$ alkyl.

13. The compound of claim 1, wherein said perfluoro $C_1$-$C_4$ alkyl is trifluoromethyl.

14. The compound of claim 1, wherein said target bonding group M comprises a reactive group for reaction with a functional group on a target material, or a functional group for reaction with a reactive group on a target material.

15. The compound of claim 14, wherein said reactive group is selected from the group consisting of succinimidyl ester, sulpho-succinimidyl ester, 4-sulfo-2,3,5,6-tetrafluorophenol (STP) ester, isothiocyanate, maleimide, haloacetamide, acid halide, hydrazide, vinylsulphone, dichlorotriazine and phosphoramidite.

16. The compound of claim 14, wherein said functional group is selected from the group consisting of hydroxy, amino, sulphydryl, imidazole, carbonyl including aldehyde and ketone, carboxylic acid and thiophosphate.

17. The compound of claim 1, wherein said target bonding group M comprises an affinity tag.

18. The compound of claim 1, wherein P is selected from the group consisting of antibody, lipid, protein, peptide, carbohydrate, nucleotides which contain or are derivatized to contain one or more of an amino, sulphydryl, carbonyl, hydroxyl, carboxylic acid and thiophosphate groups, and oxy or deoxy polynucleic acids which contain or are derivatized to contain one or more of an amino, sulphydryl, carbonyl, hydroxyl, carboxylic acid and thiophosphate groups, microbial materials, drugs, hormones, cells, cell membranes and toxins.

19. A method of labelling a component comprising:
a) contacting said component with a compound of claim 1; and
b) reacting said compound with said component such that said compound labels said component.

20. The method of claim 19, wherein said component is selected from the group consisting of antibody, lipid, protein, peptide, carbohydrate, nucleotides which contain or are derivatized to contain one or more of an amino, sulphydryl, carbonyl, hydroxyl, carboxylic acid and thiophosphate groups, and oxy or deoxy polynucleic acids which contain or are derivatized to contain one or more of an amino, sulphydryl, carbonyl, hydroxyl, carboxylic acid and thiophosphate groups, microbial materials, drugs, hormones, cells, cell membranes, toxins, polymer particles, and glass beads.

21. A compound selected from:

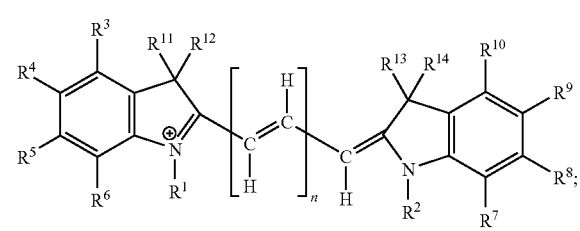
(II)

-continued

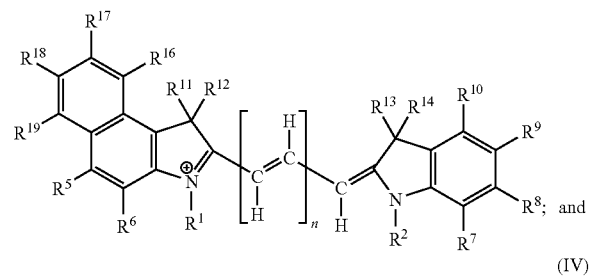
(III)

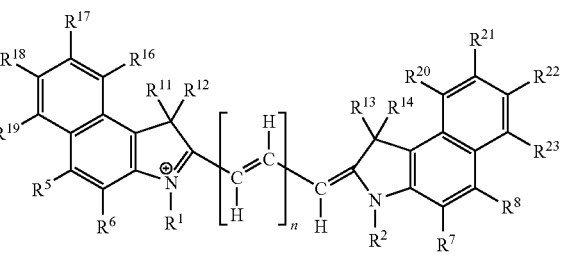
(IV)

wherein:
at least one of groups $R^1$, $R^2$, $R^{11}$, $R^{12}$, $R^{13}$ and $R^{14}$ is -L-M or -L-P, where L is a linking group having the formula:

$$-(CHR')_p-Q-(CHR')_r-$$

where Q is selected from: —CHR'—, —NR'—, —O—, —S—, —C(O)—NR'— and —C(O)—O—,
where R' is hydrogen or $C_1$-$C_4$ alkyl; p is 0-5 and r is 1-5;
M is a target bonding group; and
P is a conjugated component;
when any of groups $R^1$, $R^2$, $R^{11}$, $R^{12}$, $R^{13}$ and $R^{14}$ is not -L-M or -L-P, said remaining groups $R^1$, $R^2$, $R^{11}$, $R^{12}$, $R^{13}$ and $R^{14}$ are selected independently from $C_1$-$C_6$ alkyl, and $(CH_2)_k$—$SO_3H$, where k is an integer from 1 to 10;
at least one of groups $R^3$, $R^4$, $R^5$ and $R^6$ and/or groups $R^7$, $R^8$, $R^9$ and $R^{10}$ is —$SO_2$—$CF_3$ and any remaining groups $R^3$, $R^4$, $R^5$, $R^6$, $R^7$, $R^8$, $R^9$, and $R^{10}$ are selected from H or F; groups $R^{16}$, $R^{17}$, $R^{18}$, $R^{19}$, $R^{20}$, $R^{21}$, $R^{22}$, and $R^{23}$ when present are selected independently from hydrogen, —$SO_2$—$CF_3$ and —$(CF_2)_m$—F, where m is 0 or an integer from 1 to 4; and
n is an integer from 1 to 3.

22. The compound of claim 21, wherein:
at least one of groups $R^1$ and $R^2$ is -L-M or -L-P and any remaining group $R^1$ or $R^2$ is selected from $C_1$-$C_6$ alkyl and —$(CH_2)_k$—$SO_3H$;
at least one of groups $R^{11}$, $R^{12}$, $R^{13}$ and $R^{14}$ is —$(CH_2)_k$—$SO_3H$ and any remaining groups $R^{11}$, $R^{12}$, $R^{13}$ and $R^{14}$ are $C_1$-$C_6$ alkyl.

23. The compound of claim 21, wherein remaining group $R^1$ or $R^2$ is —$(CH_2)_k$—$SO_3H$.

24. The compound of claim 21, wherein at least two of $R^{11}$, $R^{12}$, $R^{13}$ and $R^{14}$ are —$(CH_2)_k$—$SO_3H$.

25. The compound of claim 24, wherein one of groups $R^{11}$ and $R^{12}$ and one of groups $R^{13}$ and $R^{14}$ is —$(CH_2)_k$—$SO_3H$; and remaining groups $R^{11}$, $R^{12}$, $R^{13}$ or $R^{14}$ are $C_1$-$C_6$ alkyl.

26. The compound of claim 21, wherein:
at least one of groups $R^{11}$, $R^{12}$, $R^{13}$ and $R^{14}$ is -L-M or -L-P and any remaining groups $R^{11}$, $R^{12}$, $R^{13}$ and $R^{14}$ are selected from $C_1$-$C_6$ alkyl, and —$(CH_2)_k$—$SO_3H$;

at least one of groups $R^1$ and $R^2$ is —$(CH_2)_k$—$SO_3H$ and any remaining group $R^1$ or $R^2$ is $C_1$-$C_6$ alkyl.

27. The compound of claim 26, wherein $R^1$ and $R^2$ are —$(CH_2)_k$—$SO_3H$.

28. The compound of claim 21, wherein —$(CH_2)_k$—$SO_3H$ is selected from —$(CH_2)_3$—$SO_3H$ and —$(CH_2)_4$—$SO_3H$.

29. The compound of claim 21, wherein Q is selected from: —CHR'— and —C(O)—NH—.

30. The compound of claim 21, wherein Q is —CHR'— and R' is hydrogen.

31. The compound of claim 21, wherein -L-M or -L-P comprise a carboxypentyl group.

32. The compound of claim 21, wherein said target bonding group M comprises a reactive group for reaction with a functional group on a target material, or a functional group for reaction with a reactive group on a target material.

33. The compound of claim 32, wherein said reactive group is selected from the group consisting of succinimidyl ester, sulpho-succinimidyl ester, 4-sulfo-2,3,5,6-tetrafluorophenol (STP) ester, isothiocyanate, maleimide, haloacetamide, acid halide, hydrazide, vinylsulphone, dichlorotriazine and phosphoramidite.

34. The compound of claim 32, wherein said functional group is selected from the group consisting of hydroxy, amino, sulphydryl, imidazole, carbonyl including aldehyde and ketone, carboxylic acid and thiophosphate.

35. The compound of claim 21, wherein said target bonding group M comprises an affinity tag.

36. The compound of claim 21, wherein P is selected from the group consisting of antibody, lipid, protein, peptide, carbohydrate, nucleotides which contain or are derivatized to contain one or more of an amino, sulphydryl, carbonyl, hydroxyl, carboxylic acid and thiophosphate groups, and oxy or deoxy polynucleic acids which contain or are derivatized to contain one or more of an amino, sulphydryl, carbonyl, hydroxyl, carboxylic acid and thiophosphate groups, microbial materials, drugs, hormones, cells, cell membranes and toxins.

37. A method of labelling a component comprising:
   a) contacting said component with a compound of claim 21; and
   b) reacting said compound with said component such that said compound labels said component.

38. The method of claim 37, wherein said component is selected from the group consisting of antibody, lipid, protein, peptide, carbohydrate, nucleotides which contain or are derivatized to contain one or more of an amino, sulphydryl, carbonyl, hydroxyl, carboxylic acid and thiophosphate groups, and oxy or deoxy polynucleic acids which contain or are derivatized to contain one or more of an amino, sulphydryl, carbonyl, hydroxyl, carboxylic acid and thiophosphate groups, microbial materials, drugs, hormones, cells, cell membranes, toxins, polymer particles, and glass beads.

* * * * *